US012799715B2

(12) United States Patent
Horii

(10) Patent No.: US 12,799,715 B2
(45) Date of Patent: Nov. 17, 2026

(54) WORKING MACHINE

(71) Applicant: KUBOTA CORPORATION, Osaka (JP)

(72) Inventor: Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 291 days.

(21) Appl. No.: 18/738,298

(22) Filed: Jun. 10, 2024

(65) Prior Publication Data

US 2024/0328118 A1 Oct. 3, 2024

Related U.S. Application Data

(63) Continuation of application No. PCT/JP2022/047267, filed on Dec. 22, 2022.

(30) Foreign Application Priority Data

Dec. 29, 2021 (JP) ................................ 2021-215374

(51) Int. Cl.

*E02F 9/22* (2006.01)
*E02F 3/32* (2006.01)

(Continued)

(52) U.S. Cl.

CPC ............ *E02F 9/2203* (2013.01); *E02F 3/325* (2013.01); *E02F 3/964* (2013.01); *E02F 9/2012* (2013.01);

(Continued)

(58) Field of Classification Search

None

See application file for complete search history.

(56) References Cited

U.S. PATENT DOCUMENTS 5,860,231 A * 1/1999 Lee ....................... E02F 9/2025 701/50
2005/0204734 A1* 9/2005 Oka ...................... E02F 9/2239 60/428

(Continued)

FOREIGN PATENT DOCUMENTS

JP 2018-189127 A 11/2018
JP 2021-105327 A 7/2021

OTHER PUBLICATIONS

International Search Report dated Feb. 21, 2023 in World Intellectual Property Organization Patent Application No. PCT/JP2022/047267 with an English translation thereof.

(Continued)

*Primary Examiner* — Justin S Lee
(74) *Attorney, Agent, or Firm* — GREENBLUM & BERNSTEIN, P.L.C.

(57) ABSTRACT

In a working machine, a controller controls actuation of control valves for hydraulic actuators in response to operations performed on operation members. The controller is capable of performing second control for controlling the actuation of each of the control valves based on the amount of an operation performed on a corresponding one of the operation members and the correspondence between a preset operation amount for the operation member and the actuation amount of the control valve and first control for controlling, in accordance with the amount of the operation performed on the operation member, the actuation of the control valve such that the flow rate of the hydraulic fluid supplied from the control valve to the corresponding hydraulic actuator increases to be greater than that in the second control. The controller performs the first control when the operation on the operation member is performed to realize a predetermined operation state.

15 Claims, 16 Drawing Sheets

(51) Int. Cl.

| | |
|---|---|
| ***E02F 3/96*** | (2006.01) |
| ***E02F 9/20*** | (2006.01) |
| ***E02F 9/26*** | (2006.01) |
| ***F15B 13/04*** | (2006.01) |

(52) U.S. Cl.
CPC .......... *E02F 9/2285* (2013.01); *E02F 9/2296* (2013.01); *E02F 9/26* (2013.01); *F15B 13/0401* (2013.01); *E02F 9/2292* (2013.01)

(56) References Cited

U.S. PATENT DOCUMENTS

| | | | | |
|---|---|---|---|---|
| 2009/0056322 | A1* | 3/2009 | Brinkman | E02F 9/221 60/325 |
| 2015/0330415 | A1* | 11/2015 | Takahashi | F15B 11/168 60/420 |
| 2017/0227028 | A1 | 8/2017 | Ueda | |
| 2018/0100290 | A1* | 4/2018 | Greer | F15B 11/16 |
| 2018/0106278 | A1* | 4/2018 | Amano | F15B 11/044 |
| 2018/0156242 | A1* | 6/2018 | Takebayashi | F15B 9/03 |
| 2020/0056351 | A1 | 2/2020 | Ono et al. | |
| 2023/0021137 | A1 | 1/2023 | Horii | |

OTHER PUBLICATIONS

Written Opinion dated Feb. 21, 2023 in World Intellectual Property Organization Patent Application No. PCT/JP2022/047267 with an English translation thereof.

Extended European Search Report, dated Nov. 19, 2025, issued in European family member application No. 22915895.1.

* cited by examiner

WORKING MACHINE

CROSS REFERENCE TO RELATED APPLICATIONS

This application is a continuation application of International Application No. PCT/JP2022/047267, filed on Dec. 22, 2022, which claims the benefit of priority to Japanese Patent Application No. 2021-215374, filed on Dec. 29, 2021. The entire contents of each of these applications are hereby incorporated herein by reference.

BACKGROUND OF THE INVENTION

1. Field of the Invention

The present invention relates to a working machine.

2. Description of the Related Art

In the related art, a working machine disclosed in Japanese Unexamined Patent Application Publication No. 2021-105327 is known.

In the working machine disclosed in Japanese Unexamined Patent Application Publication No. 2021-105327, a boom is swingably supported on a machine body, an arm is swingably supported on the boom, and a working tool is swingably supported on the arm. The working tool is driven by a working-tool cylinder, and a working-tool control valve that controls the working-tool cylinder is controlled by a controller.

SUMMARY OF THE INVENTION

In the related art, for example, in an operation that is performed by quickly swinging a working tool back and forth, actuation of the working-tool control valve sometimes fails to keep pace with movement of an operation member, so that a desired swing amount cannot be obtained in some cases.

The present invention has been made in view of the above problem, and it is an object of the present invention to provide a working machine capable of improving responsiveness of a hydraulic actuator when a predetermined operation is performed.

A working machine according to an aspect of the present invention includes a machine body, a working device mounted on the machine body, a hydraulic actuator to drive the working device, a control valve to switch a state of a hydraulic fluid supplied to the hydraulic actuator, an operation member to receive an operation instruction for the hydraulic actuator, and a controller to control actuation of the control valve in response to an operation performed on the operation member. The controller is capable of performing second control for controlling actuation of the control valve based on an amount of an operation performed on the operation member and a correspondence between a preset operation amount for the operation member and an actuation amount of the control valve and first control for controlling, in accordance with an operation amount that is an amount of an operation performed on the operation member, actuation of the control valve in such a manner that a flow rate of a hydraulic fluid supplied from the control valve to the hydraulic actuator increases to be greater than in the second control, and the controller performs the first control when an operation on the operation member is performed to realize a predetermined operation state.

The working machine may include another hydraulic actuator different from the hydraulic actuator. The controller may perform the first control when the realized operation state is a state where a single operation of the hydraulic actuator is performed, and may perform the second control when the realized operation state is a state where a combined operation of the hydraulic actuator and the another hydraulic actuator is performed.

The working machine may include a selector switch to receive an instruction to select between the first control and the second control. The controller may perform the second control when an operation is performed on the operation member in a state in which the second control is selected by the selector switch and may perform the first control when an operation is performed on the operation member in a state in which the first control is selected by the selector switch.

The controller may perform the first control when an operation for reversing an operation direction of the hydraulic actuator is performed on the operation member.

The controller may perform the first control when an operation for reversing an operation direction of the hydraulic actuator is repeatedly performed on the operation member within a certain period of time.

The control valve may be pilot-operated by a pilot control pressure that is controlled based on a control signal transmitted by the controller, and the controller may increase the pilot control pressure in the first control to be greater than in the second control.

The control valve may be controlled in accordance with a current value supplied thereto from the controller, and the controller may increase the current value supplied to the control valve in the first control to be greater than in the second control.

The controller may store a first characteristic line indicating a relationship between the operation amount of the operation member and the current value in the first control and a second characteristic line indicating a relationship between the operation amount of the operation member and the current value in the second control. A degree of change in the current value with respect to a change in the operation amount of the operation member in the first characteristic line may be set to be greater than a degree of change in the current value with respect to a change in the operation amount of the operation member in the second characteristic line.

The controller may set an operation amount of the operation member with a maximum current value in the first characteristic line to be less than an operation amount of the operation member with a maximum current value in the second characteristic line.

The current value corresponding to an operation amount of the operation member may be set to be greater in the first characteristic line than in the second characteristic line until the operation amount of the operation member reaches a predetermined operation amount that is less than a maximum operation amount, and when an operation amount of the operation member exceeds the predetermined operation amount, the current value in the second characteristic line may be set to be equal to a maximum current value in the first characteristic line.

The working machine may include a selector switch to receive an instruction to select between the first control and the second control. The controller may set the current value corresponding to an operation amount of the operation member to a maximum current value when the first control is selected by the selector switch.

The controller may automatically perform control for repeatedly reversing an operation direction of the hydraulic actuator when the first control is selected by the selector switch.

The working machine may include another hydraulic actuator different from the hydraulic actuator, and the working machine may further include a variable displacement pump to deliver hydraulic fluid for causing a plurality of hydraulic actuators including the hydraulic actuator and the other hydraulic actuator to operate and a load sensing system to control the pump in such a manner that a pressure difference between a delivery pressure of the pump and a highest load pressure among the plurality of hydraulic actuators becomes a constant pressure.

The working machine may include a boom swingably supported on the machine body, an arm swingably supported on the boom, and a working tool swingably supported on the arm. The hydraulic actuator may be any one or more of a boom cylinder to cause the boom to swing, an arm cylinder to cause the arm to swing, and a working-tool cylinder to cause the working tool to swing.

The working machine may include a dozer device including a blade and a dozer cylinder to cause the blade to swing. The hydraulic actuator may be the dozer cylinder.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 11 is a configuration diagram illustrating another aspect of control valves and the like.

FIG. 12 is a configuration diagram illustrating another aspect of control valves and the like.

DETAILED DESCRIPTION OF THE EXAMPLE EMBODIMENTS

Figure 1:
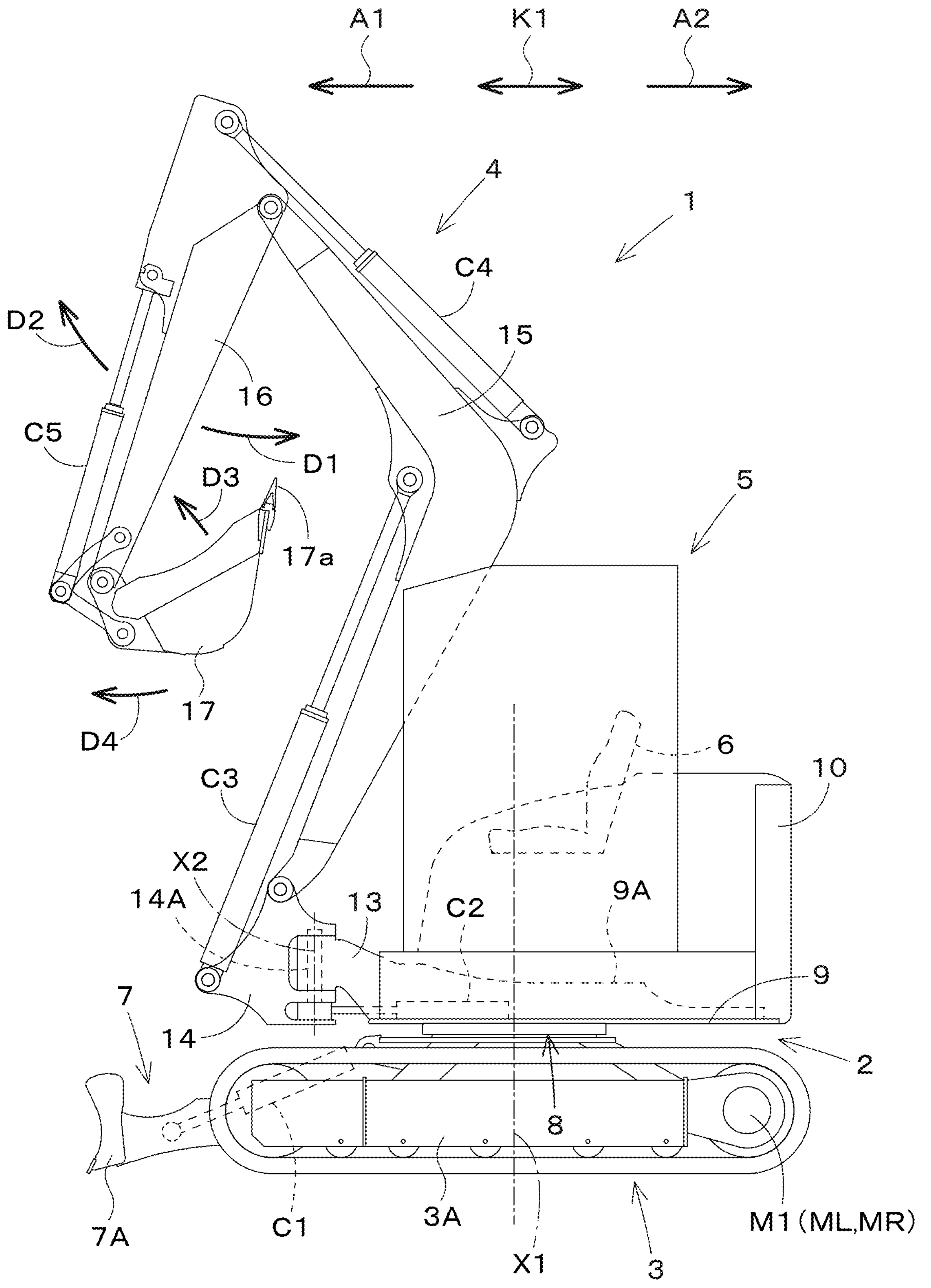
FIG. 1 a side view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 2:
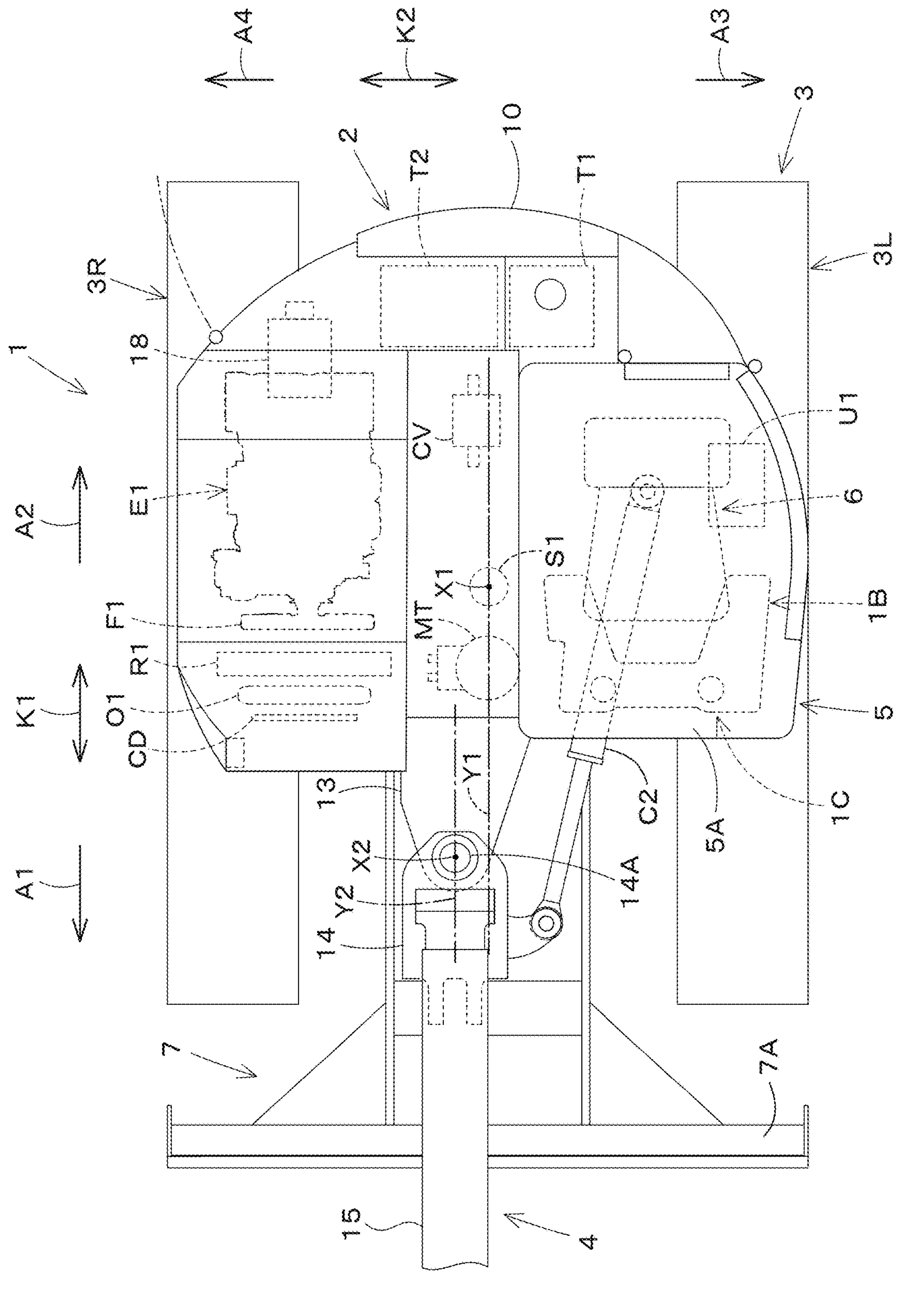
FIG. 2 is a plan view of the working machine.

FIG. 1 a schematic side view illustrating the overall configuration of a working machine 1 according to the present embodiment. FIG. 2 is a schematic plan view of the working machine 1. In the present embodiment, a backhoe, which is a slewable working machine, is described as an example of the working machine 1.

As illustrated in FIG. 1 and FIG. 2, the working machine 1 includes a machine body (a slewing base) 2, a traveling device 3, and a working device 4. A cabin 5 is mounted on the machine body 2. An operator's seat 6 where an operator (a driver) sits is provided inside the cabin 5.

In the present embodiment, a direction toward the front of the operator in the operator's seat 6 of the working machine 1 (the direction of arrow A1 in FIG. 1 and FIG. 2) corresponds to a front direction (a machine-body front direction), and a direction toward the rear of the operator (the direction of arrow A2 in FIG. 1 and FIG. 2) corresponds to a rear direction (a machine-body rear direction). Directions K1 in FIG. 1 and FIG. 2 will be referred to as front and rear directions (a machine-body longitudinal direction). A direction toward the left of the operator (toward the near side in FIG. 1, the direction of arrow A3 in FIG. 2) corresponds to a left direction, and a direction toward the right of the operator (toward the far side in FIG. 1, the direction of arrow A4 in FIG. 2) corresponds to a right direction. The horizontal direction that is a direction perpendicular to the front and rear directions (machine-body longitudinal direction) K1 will be referred to as a machine-body width direction K2 (see FIG. 2).

As illustrated in FIG. 1 and FIG. 2, the traveling device 3 is a device that is capable of traveling and that supports the machine body 2. The traveling device 3 includes a traveling frame 3A, a first traveling device 3L provided on the left of the traveling frame 3A, and a second traveling device 3R provided on the right of the traveling frame 3A. The first traveling device 3L and the second traveling device 3R are each a crawler traveling device. The traveling device 3 is driven by a traveling motor M1 that is formed of a hydraulic motor (a hydraulic actuator). More specifically, the first traveling device 3L is driven by a first traveling motor ML, and the second traveling device 3R is driven by a second traveling motor MR.

A dozer device (a working device) 7 is mounted on a front portion of the traveling device 3. The dozer device 7 is driven by a dozer cylinder C1. More specifically, the dozer cylinder C1 is formed of a hydraulic cylinder (a hydraulic actuator), and a blade 7A of the dozer device 7 is raised and lowered by expansion and contraction of the dozer cylinder C1.

As illustrated in FIG. 1, the machine body 2 is supported on the traveling device 3 (the traveling frame 3A) with a slewing bearing 8 interposed therebetween such that the machine body 2 is turnable around a turning axis X1. The turning axis X1 is an axis (a vertical axis) that vertically extends in such a manner as to pass through the center of the slewing bearing 8.

As illustrated in FIG. 2, the cabin 5 is mounted on a portion of the machine body 2 on one side (left side) in the width direction K2 of the machine body 2. The cabin 5 is located on one side (left side) of a center line Y1 in the machine-body width direction K2, the center line Y1 extending in the front and rear directions K1 in such a manner as to pass through the turning axis X1.

As illustrated in FIG. 2, a prime mover E1 is mounted on a portion of the machine body 2 on the other side (right side) in the width direction K2 of the machine body 2. The prime mover E1 is vertically mounted on the machine body 2. The phrase "vertically mounted" refers to being mounted such that the axis of a crankshaft of the prime mover E1 extends in the front and rear directions K1. The prime mover E1 is a diesel engine. Note that the prime mover E1 may be a gasoline engine or an electric motor or may be a hybrid prime mover that includes an engine and an electric motor.

A pressure-oil supply unit 18 is mounted on a rear portion of the prime mover E1. The pressure-oil supply unit 18 is driven by the power of the prime mover E1 so as to pressurize and deliver a hydraulic fluid that is used by a hydraulic driving unit. The hydraulic driving unit is, for example, a hydraulic actuator or the like installed in the working machine 1. A radiator R1, an oil cooler O1, and a condenser CD are positioned in front of the prime mover E1 and mounted on the machine body 2. The radiator R1 is a cooler that cools cooling water (a fluid) of the prime mover E1, and the oil cooler O1 is a cooler that cools a hydraulic fluid (a fluid). The condenser CD is a cooler (a condenser) that cools refrigerant (a fluid) of an air-conditioning apparatus (an air conditioner) installed in the working machine 1.

A cooling fan F1 that generates cooling air for cooling the prime mover E1 is disposed between the radiator R1 and the prime mover E1. The cooling fan F1 is driven by the power of the prime mover E1 and generates the cooling air that flows from the front to the rear.

As illustrated in FIG. 1, the machine body 2 includes a board (hereinafter referred to as "slewing board") 9 that is turnable around the turning axis X1. The slewing board 9 is formed of a steel plate or the like and forms a bottom portion of the machine body 2. A vertical rib 9A, which is a reinforcement member, is provided on the upper surface of the slewing board 9 in such a manner as to extend from a front portion to a rear portion of the slewing board 9. In addition to the vertical rib 9A, members and the like that are used for supporting equipment and so forth mounted on the machine body 2 are provided on the slewing board 9, so that a slewing frame that serves as a framework of the machine body 2 is formed. The peripheral area of the slewing frame in the horizontal direction is covered with a slewing cover.

A weight 10 is disposed on a rear portion of the machine body 2. The weight 10 is positioned at the rear portion of the machine body 2, and a lower portion of the weight 10 is attached to the slewing board 9.

As illustrated in FIG. 2, a fuel tank T1 and a hydraulic-fluid tank T2 are mounted on the rear portion of the machine body 2 in such a manner as to be arranged next to each other in the machine-body width direction K2. The fuel tank T1 is a tank that stores fuel for the prime mover E1. The hydraulic-fluid tank T2 is a tank that stores a hydraulic fluid.

As illustrated in FIG. 2, a slewing motor MT is disposed in such a manner as to be positioned at the front of the slewing board 9 (the machine body 2) and at the center of the slewing board 9 (the machine body 2) in the machine-body width direction K2. The slewing board 9 is driven by the slewing motor MT so as to turn around the turning axis X1. The slewing motor MT is a hydraulic motor (a hydraulic actuator). A swivel joint S1 is provided at the position of the turning axis X1. The swivel joint S1 is hydraulic equipment that circulates a hydraulic fluid and is a rotation joint (rotary joint) that causes a hydraulic fluid to flow between hydraulic equipment included in the machine body 2 and hydraulic equipment included in the traveling device 3. A control valve (hydraulic equipment) CV is disposed behind the swivel joint S1. The control valve unit CV is a sectional-type multi-control valve (hydraulic equipment) that includes a plurality of control valves stacked on top of one another in the vertical direction and coupled to one another. A controller U1 is disposed below the cabin 5.

A manipulator 1B for manipulating the working machine 1 is installed in the cabin 5. The manipulator 1B is disposed in front of the operator's seat 6. The operator's seat 6 and the manipulator 1B form an operating section 1C.

As illustrated in FIG. 2, the machine body 2 includes a support bracket 13 that is provided at the front portion of the machine body 2 in such a manner as to be slightly offset rightward from the center of the machine body 2 in the machine-body width direction K2. The support bracket 13 is fixed to a front portion of the vertical rib 9A and disposed so as to project forward from the machine body 2.

As illustrated in FIG. 1 and FIG. 2, a swing bracket 14 is attached to a front portion (a portion projecting from the machine body 2) of the support bracket 13 via a swing shaft 14A so as to be swingable around a swing axis X2, which is an axis that extends in the vertical direction. Accordingly, the swing bracket 14 is rotatable in the machine-body width direction K2 (in the horizontal direction around the swing shaft 14A).

As illustrated in FIG. 1, the working device 4 is supported on the swing bracket 14 (the machine body 2).

The working device 4 includes a boom 15 that is supported on the machine body 2 so as to be vertically swingable (so as to be capable of swinging in the vertical direction), an arm 16 that is pivotally supported and connected to the boom 15 so as to be swingable, and a working tool 17 that is pivotally supported and connected to the arm 16 so as to be swingable. In the present embodiment, the working tool 17 is a bucket.

A base portion of the boom 15 is pivotally supported on an upper portion of the swing bracket 14 via a pivot shaft. More specifically, the base portion of the boom 15 is attached to the upper portion of the swing bracket 14 so as to be pivotable around a horizontal axis (an axis extending in the machine-body width direction K2) in a state where the boom 15 is oriented in a direction toward an area in front of the machine body. This enables the boom 15 to swing in the vertical direction.

The arm 16 is pivotally supported at an end of the boom 15 via a pivot shaft. More specifically, the arm 16 is attached to the boom 15 so as to be pivotable around a horizontal axis in a state where the boom 15 is oriented in the direction toward the area in front of the machine body. This enables the arm 16 to swing in the front and rear directions K1 or the vertical direction. In addition, the arm 16 is swingable in an arm-crowd direction D1 that is a direction toward the boom 15 and an arm-dump direction D2 that is a direction away from the boom 15.

The bucket 17 is pivotally supported at an end of the boom 15 via a pivot shaft via a pivot shaft. More specifically, the bucket 17 is attached to the arm 16 so as to be pivotable around a horizontal axis in a state where the boom 15 is oriented in the direction toward the area in front of the machine body. This enables the bucket 17 to swing in a direction toward the arm 16 (a bucket-crowd direction D3) and a direction away from the arm 16 (a bucket-dump direction D4). In other words, the bucket 17 is attached to the arm 16 so as to be capable of performing a shoveling operation and a dumping operation. The shoveling operation is an operation of causing the bucket 17 to swing in the direction toward the boom 15 (in the bucket-crowd direction D3) and is, for example, an operation of scooping earth and sand or the like. The dumping operation is an operation of causing the bucket 17 to swing in the direction away from the boom 15 (in the bucket-dump direction D4) and is, for example, an operation of dropping (discharging) scooped earth and sand or the like.

Note that, instead of the bucket, a working tool (an attachment), such as a pallet fork or a manure fork, or a working tool (a hydraulic attachment) that includes a hydraulic actuator, such as a grapple, a hydraulic crusher, an angle broom, an earth auger, a snow blower, a sweeper, a mower, or a hydraulic breaker, may be attached as the working tool 17.

Expansion and contraction of a swing cylinder C2 that is included in the machine body 2 enables the swing bracket 14 to swing. The boom 15 is driven by a boom cylinder C3. More specifically, expansion and contraction of the boom cylinder C3 enables the boom 15 to vertically swing. The arm 16 is driven by an arm cylinder C4. More specifically, expansion and contraction of the arm cylinder C4 enables the arm 16 to swing in the arm-crowd direction D1 and the arm-dump direction D2. The bucket 17 is driven by a working-tool cylinder C5. More specifically, expansion and contraction of the working-tool cylinder (a bucket cylinder) C5 enables the working tool 17 to swing in the bucket-crowd direction D3 and the bucket-dump direction D4. The swing cylinder C2, the boom cylinder C3, the arm cylinder C4, and the working-tool cylinder C5 are each formed of a hydraulic cylinder (a hydraulic actuator).

A hydraulic system for actuating various hydraulic actuators ML, MR, MT, and C1 to C6 that are included in the working machine 1 will now be described with reference to FIG. 3 to FIG. 7.

Figure 3:
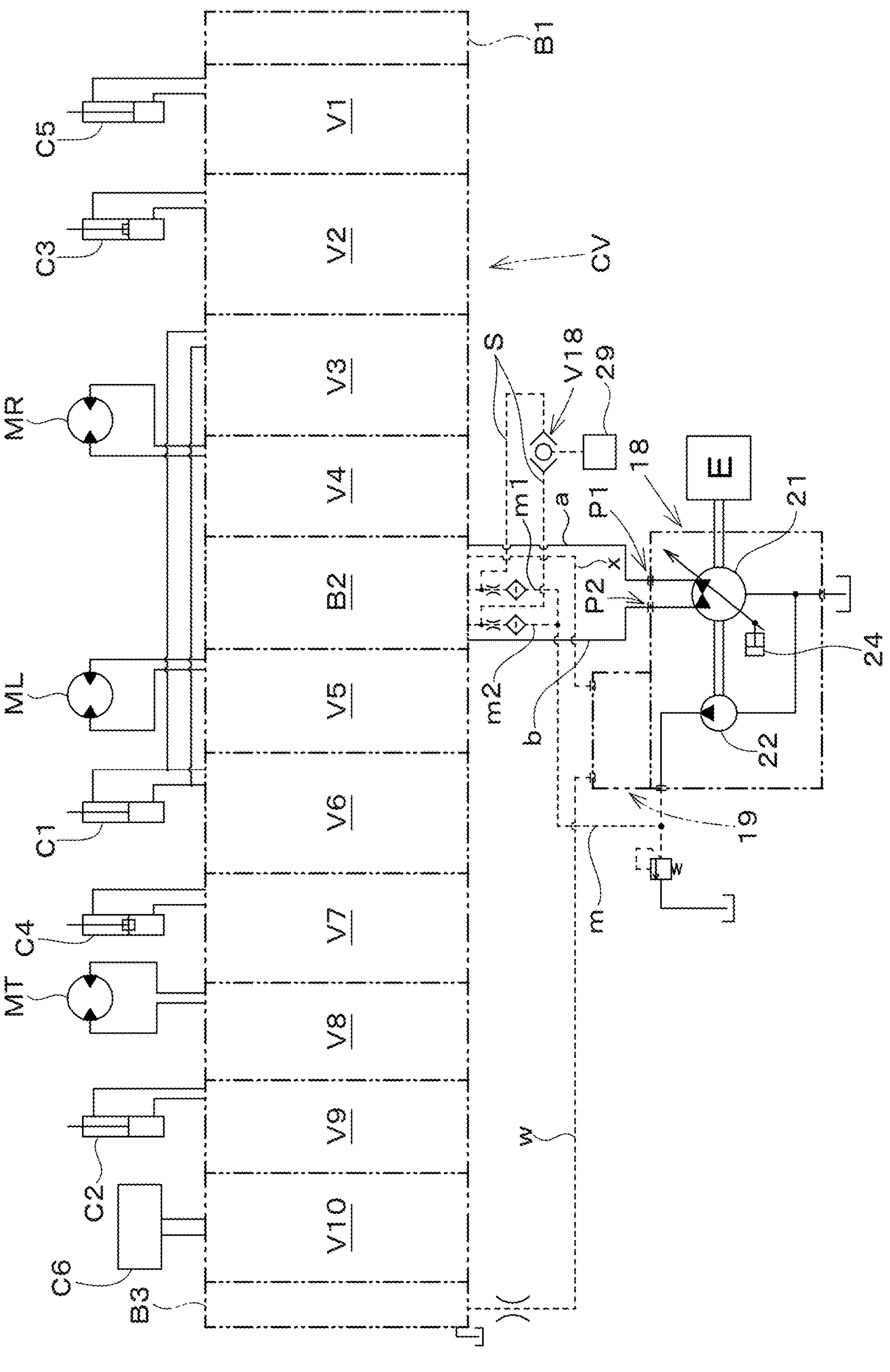
FIG. 3 is a schematic diagram of a hydraulic system.

As illustrated in FIG. 3, the hydraulic system includes the control valve unit CV, the pressure-oil supply unit 18, and a flow-rate controller 19. The control valve unit CV is an aggregate of control valves V1 to V10 that control the various hydraulic actuators ML, MR, MT, and C1 to C6 (that switch the state of a hydraulic fluid supplied to the hydraulic actuators), an inlet block B2 for taking in a pressure oil, and a pair of outlet blocks B1 and B3 for discharging a pressure oil arranged in one direction.

As illustrated in FIG. 3, in the control valve unit CV of the present embodiment, the first outlet block B1, the working-tool control valve V1 that controls the working-tool cylinder C5, the boom control valve V2 that controls the boom cylinder C3, the dozer first control valve V3 that controls the dozer cylinder C1, the second traveling control valve V4 that controls the traveling motor MR of the second traveling device 3R, the inlet block B2, the first traveling control valve V5 that controls the traveling motor ML of the first traveling device 3L, the dozer second control valve V6 that controls the dozer cylinder C1, the arm control valve V7 that controls the arm cylinder C4, the slew control valve V8 that controls the slewing motor MT, the swing control valve V9 that controls the swing cylinder C2, the SP control valve V10 that controls the attachment actuator (a hydraulic actuator) C6 included in a hydraulic attachment in the case where the hydraulic attachment is attached as the working tool 17, and the second outlet block B3 are arranged in this order (starting from the right side in FIG. 3) and connected to one another.

As illustrated in FIG. 4 to FIG. 7, each of the control valves V1 to V10 includes a corresponding one of directional switching valves DV1 to DV10 and a pressure compensation valve (a compensator valve) V11 incorporated in its valve body. The directional switching valves DV1 to DV10 are valves that switch a flow direction of the hydraulic fluid with respect to the hydraulic actuators ML, MR, MT, and C1 to C6 that are control targets. In a direction in which the pressure oil is supplied, the pressure compensation valves V11 are disposed downstream from the directional switching valves DV1 to DV10 and upstream from the hydraulic actuators ML, MR, MT, and C1 to C6, which are control targets. The pressure compensation valves V11 function as adjusters for loads among the hydraulic actuators ML, MR, MT, and C1 to C6 when a plurality of the control valves V1 to V10 are used.

A first relief valve V12 and a first unloading valve V13 are incorporated in the first outlet block B1, and a traveling independent valve V14 is incorporated in the inlet block B2. The first relief valve V12 is a main relief valve that regulates the pressure of the hydraulic fluid delivered from a first pressure-oil delivery port P1, which will be described later.

The traveling independent valve V14 includes a direct-acting spool switching valve and includes a pilot-operated switching valve that is switch-operated by a pilot control pressure.

A second relief valve V15 and a second unloading valve V16 are incorporated in the second outlet block B3. The second relief valve V15 is a main relief valve that regulates the pressure of the hydraulic fluid delivered from a second pressure-oil delivery port P2, which will be described later.

The directional switching valves DV1 to DV10 are each formed of a direct-acting spool switching valve. In addition, each of the directional switching valves DV1 to DV10 is a control valve that is electrically controlled by the controller U1. More specifically, for example, pilot-operated proportional solenoid valves are used as the directional switching valves DV1 to DV10. A pilot-operated proportional solenoid valve is a valve in which a spool is moved by a pilot control pressure, which is controlled by a proportional solenoid, so as to control a flow direction and a flow rate of a hydraulic fluid. More specifically, a pilot-operated proportional solenoid valve is a two-stage directional and flow control valve that employs a proportional solenoid pressure reducing valve with two proportional solenoids in its pilot portion. The flow rate is controlled by changing a current that is input to the proportional solenoids, and the flow direction is controlled by supplying a current to one of the two proportional solenoids.

Figure 4:
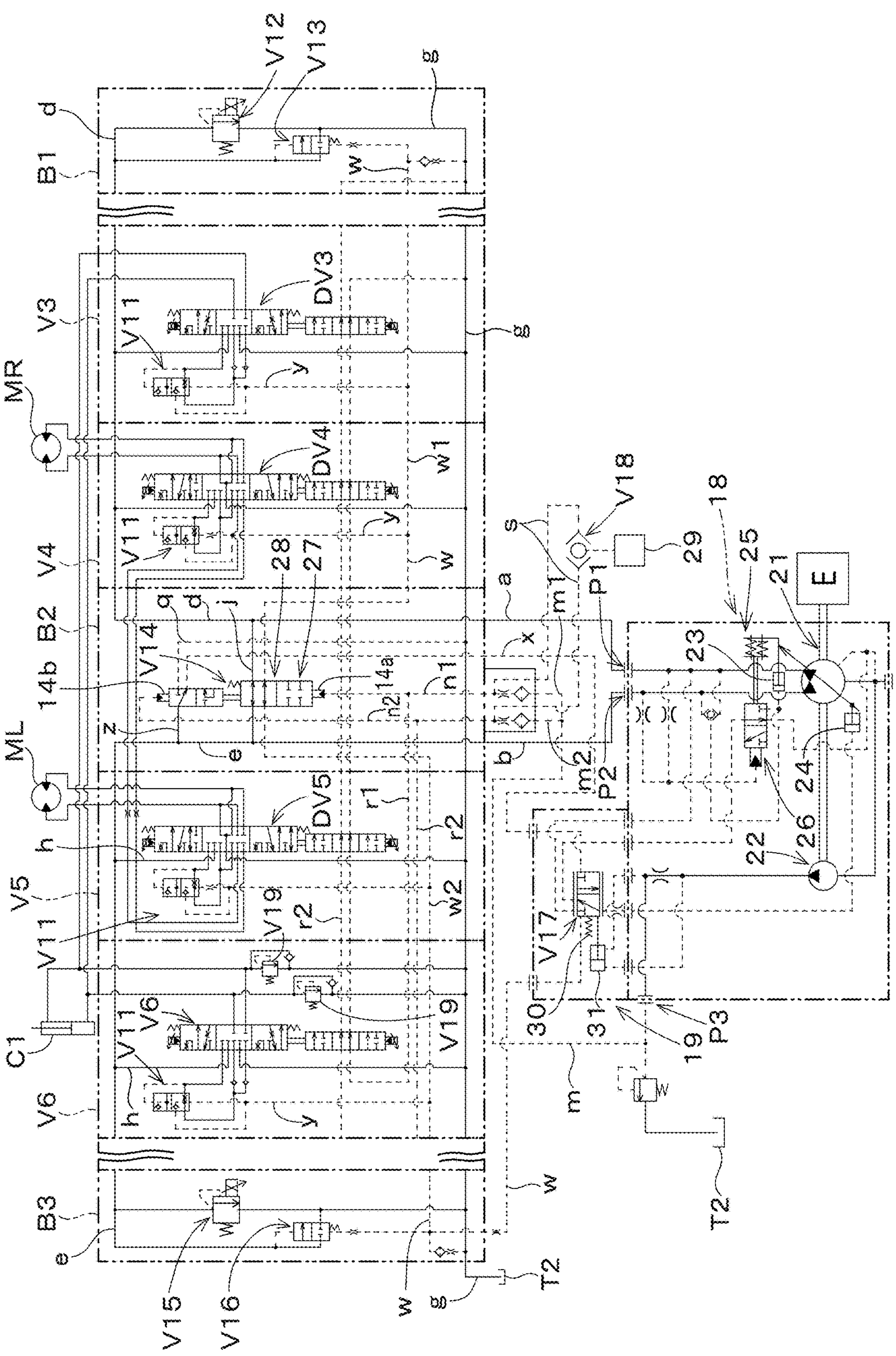
FIG. 4 is a circuit diagram of part of the hydraulic system.
Figure 5:
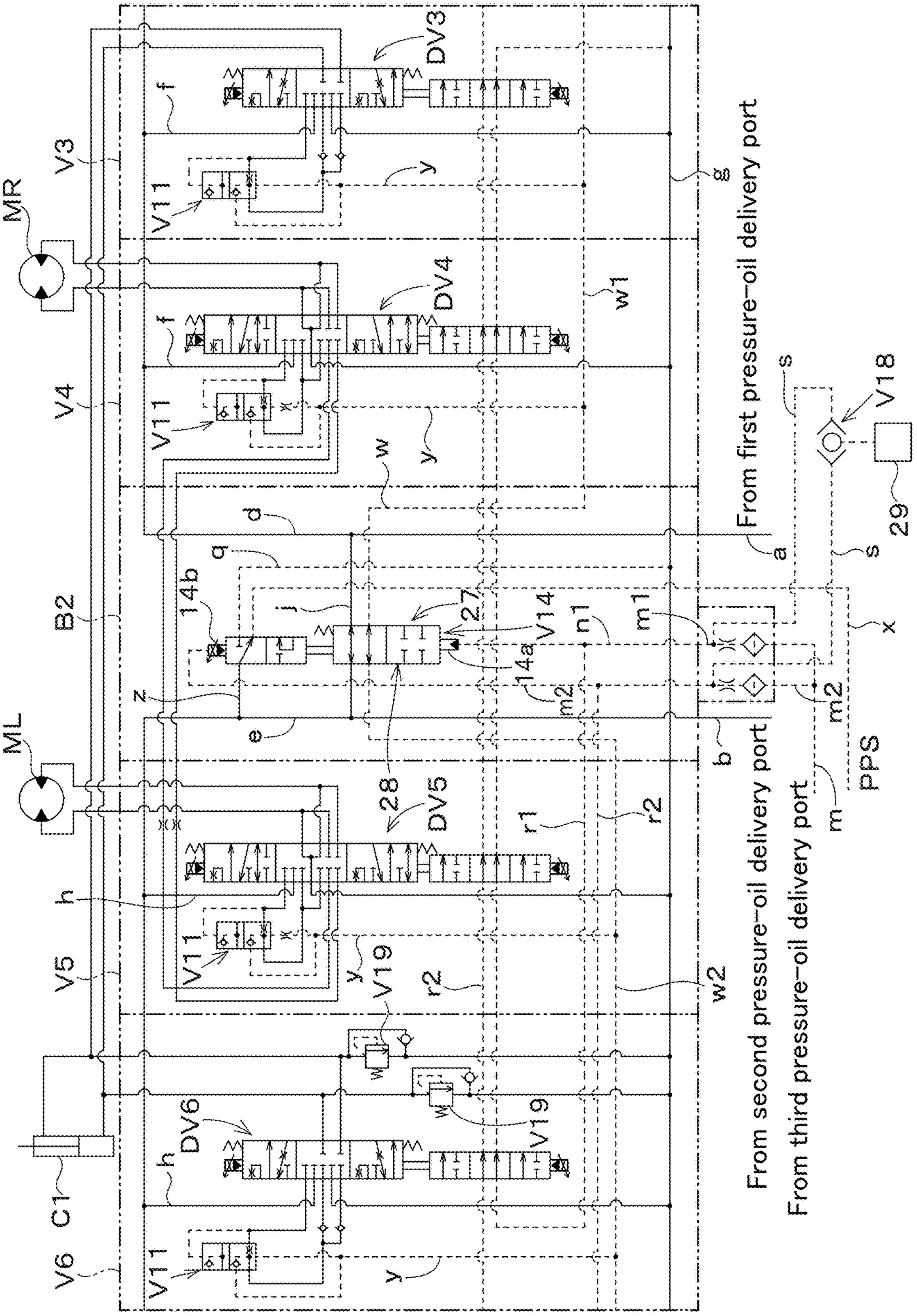
FIG. 5 is a circuit diagram of a portion of a control valve.
Figure 6:
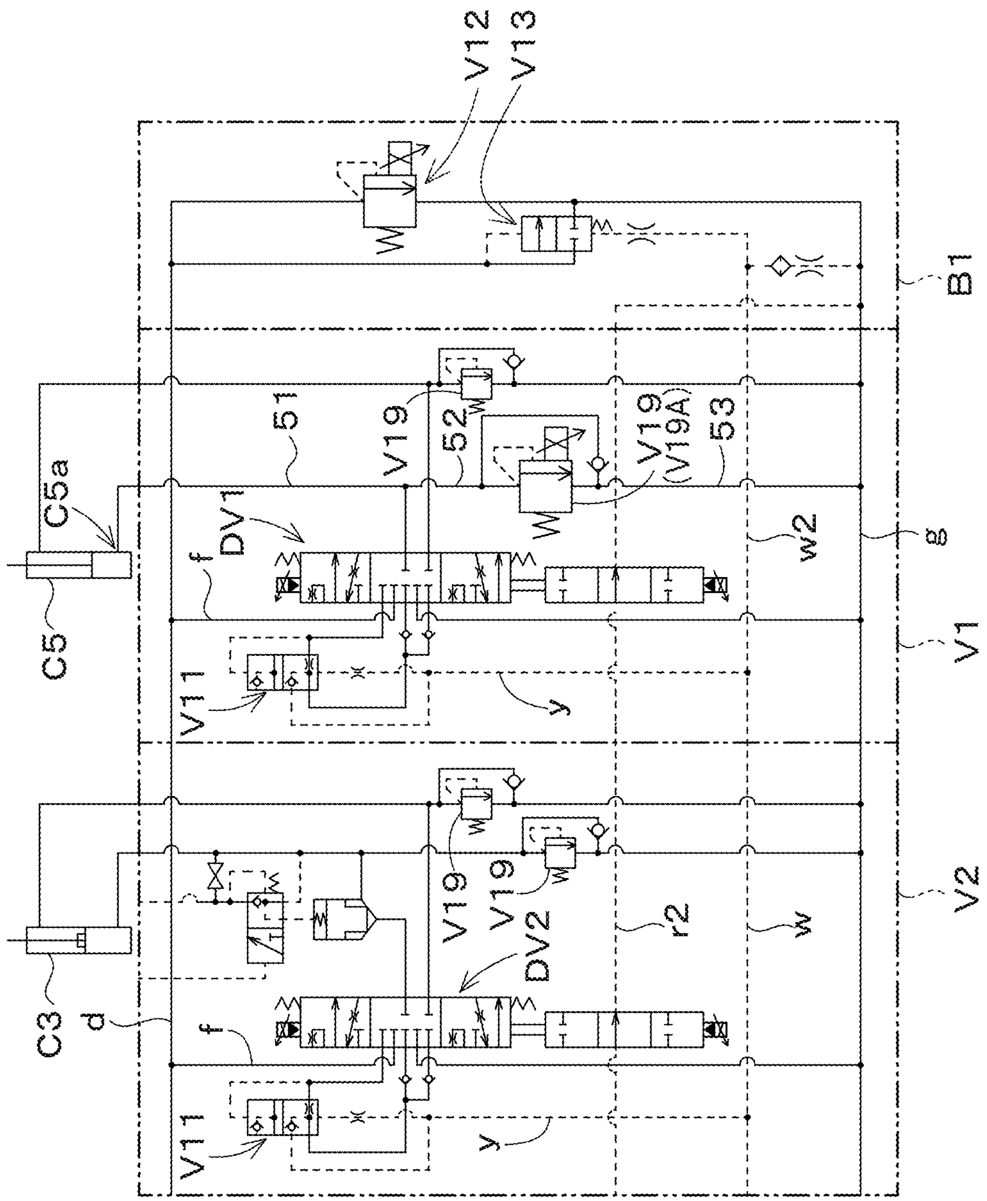
FIG. 6 is a circuit diagram of another portion of the control valve.
Figure 7:
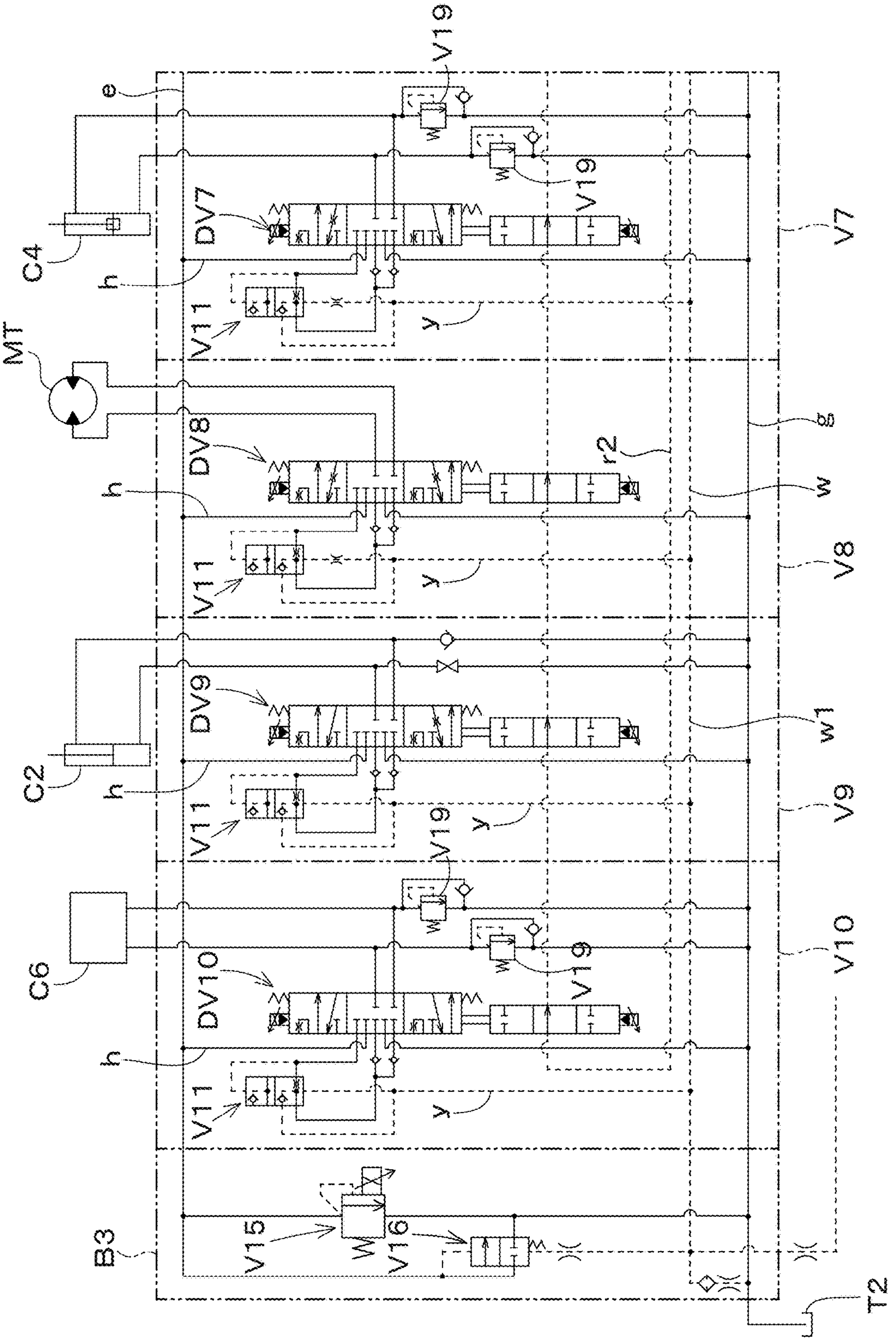
FIG. 7 is a circuit diagram of a portion of the control valve different from the other portion of the control valve.

As illustrated in FIG. 4, the hydraulic system includes hydraulic pumps that serve as pressure-oil supply sources, and the hydraulic pumps include a first pump 21 for supplying a hydraulic fluid that causes the hydraulic actuators ML, MR, MT, and C1 to C6 to operate and a second pump 22 for supplying a signal pressure oil such as a pilot control pressure or a detection signal. The first pump 21 and the second pump 22 are included in the pressure-oil supply unit 18 and driven by the prime mover E1.

The first pump 21 is a variable displacement pump, and in the present embodiment, the first pump 21 is a swash-plate variable displacement axial pump that has a function of an equal-flow-rate double pump that delivers an equal amount of hydraulic fluid from the two independent pressure-oil delivery ports P1 and P2. More specifically, as the first pump 21, a split-flow hydraulic pump having a mechanism that delivers a hydraulic fluid from a single piston cylinder barrel kit alternately to delivery grooves formed inside and outside a valve plate is used.

One of the pressure-oil delivery ports that deliver the hydraulic fluid from the first pump 21 will be referred to as the first pressure-oil delivery port P1, and the other of the pressure-oil delivery ports will be referred to as the second pressure-oil delivery port P2.

Note that, in the present embodiment, although the pressure-oil delivery ports that is delivered from the hydraulic pump having two pumping functions are referred to as the first and second pressure-oil delivery ports P1 and P2, a pressure-oil delivery port of one of two hydraulic pumps that are formed separately from each other may be the first pressure-oil delivery port, and a pressure-oil delivery port of the other hydraulic pump may be the second pressure-oil delivery port.

The pressure-oil supply unit 18 includes a pressing piston 23 that presses a swash plate of the first pump 21 and a flow-rate compensation piston 24 that controls the swash plate of the first pump 21.

The first pump 21 is configured such that the self-pressure of the first pump 21 presses, through the pressing piston 23, the swash plate in a direction in which the pump flow rate increases and such that the flow-rate compensation piston 24 applies, to the swash plate, a force that resists a pressing force of the pressing piston 23, and the delivery flow rate of the first pump 21 is controlled by controlling the pressure exerted on the flow-rate compensation piston 24.

Accordingly, when the pressure exerted on the flow-rate compensation piston 24 is released, the angle of the swash plate becomes maximum, and the first pump 21 delivers fluid at a maximum flow rate.

As illustrated in FIG. 4, the flow-rate controller 19 controls the swash plate of the first pump 21. Control of the swash plate of the first pump 21 is performed by adjusting the pressure exerted on the flow-rate compensation piston 24 by controlling a flow-rate compensation valve V17 that is included in the flow-rate controller 19.

The pressure-oil supply unit 18 further includes a spring 25 and a spool 26 that control a pump horsepower (a torque) of the first pump 21 and is configured to limit, when the delivery pressure of the first pump 21 becomes a predetermined pressure, the first pump 21, a horsepower (a torque) that the first pump 21 absorbs from the prime mover E1.

The second pump 22 is formed of a fixed displacement gear pump, and a fluid delivered by the second pump 22 is delivered from a third pressure-oil delivery port P3.

The first pressure-oil delivery port P1 is connected to the inlet block B2 by a first delivery path a, and the second pressure-oil delivery port P2 is connected to the inlet block B2 via a second delivery path b.

The first delivery path a is connected to a first pressure-oil supply path d. The first pressure-oil supply path d is formed in such a manner as to extend from the inlet block B2 to the first outlet block B1 through the valve body of the second traveling control valve V4, the valve body of the dozer first control valve V3, the valve body of the boom control valve V2, and the valve body of the working-tool control valve V1 and branches at the first outlet block B1 (on a flow-path end side) so as to be connected to the first relief valve V12 and the first unloading valve V13.

The hydraulic fluid can be supplied from the first pressure-oil supply path d to the directional switching valve DV4 of the second traveling control valve V4, the directional switching valve DV3 of the dozer first control valve V3, the directional switching valve DV2 of the boom control valve V2, and the directional switching valve DV1 of the working-tool control valve V1 via a pressure-oil branch path f.

The first relief valve V12 and the first unloading valve V13 are connected to a drain fluid passage g. The drain fluid passage g is formed in such a manner as to extend from the first outlet block B1 to the second outlet block B3 through the valve body of the working-tool control valve V1, the valve body of the boom control valve V2, the valve body of the dozer first control valve V3, the valve body of the second traveling control valve V4, the inlet block B2, the valve body of the first traveling control valve V5, the valve body of the dozer second control valve V6, the valve body of the arm control valve V7, the valve body of the slew control valve V8, the valve body of the swing control valve V9, and the valve body of the SP control valve V10. The hydraulic fluid that flows through the drain fluid passage g is discharged from the second outlet block B3 to the hydraulic-fluid tank T2.

The second delivery path b is connected to a second pressure-oil supply path e. The second pressure-oil supply path e is formed in such a manner as to extend from the inlet block B2 to the second outlet block B3 through the valve body of the first traveling control valve V5, the valve body of the dozer second control valve V6, the valve body of the arm control valve V7, the valve body of the slew control valve V8, the valve body of the swing control valve V9, and the valve body of the SP control valve V10 and branches at the second outlet block B3 (on a flow-path end side) so as to be connected to the second relief valve V15 and the second unloading valve V16.

The hydraulic fluid can be supplied from the second pressure-oil supply path e to the directional switching valve DV5 of the first traveling control valve V5, the directional switching valve DV6 of the dozer second control valve V6, the directional switching valve DV7 of the arm control valve V7, the directional switching valve DV8 of the slew control valve V8, the directional switching valve DV9 of the swing control valve V9, and the directional switching valve DV10 of the SP control valve V10 via a pressure-oil branch path h. The hydraulic fluid supplied to each of the control valves V1 to V10 is supplied and discharged to and from each of the hydraulic actuators ML, MR, MT, and C1 to C6. In other words, the hydraulic system includes a hydraulic circuit for supplying and discharging the hydraulic fluid to and from the hydraulic actuators ML, MR, MT, and C1 to C6.

The second relief valve V15 and the second unloading valve V16 are connected to the drain fluid passage g.

In the inlet block B2, the first pressure-oil supply path d and the second pressure-oil supply path e are connected to each other by a communication path j that extends across the traveling independent valve V14.

The traveling independent valve V14 is freely switchable between an independent position 27 in which the traveling independent valve V14 blocks the flow of the pressure oil through the communication path j and a merging position 28 in which the traveling independent valve V14 allows the flow of the pressure oil through the communication path j.

When the traveling independent valve V14 has been switched to be in the independent position 27, the hydraulic fluid from the first pressure-oil delivery port P1 can be supplied to the directional switching valve DV4 of the second traveling control valve V4 and the directional switching valve DV3 of the dozer first control valve V3, and the hydraulic fluid from the second pressure-oil delivery port P2 can be supplied to the directional switching valve DV5 of the first traveling control valve V5 the directional switching valve DV6 of the dozer second control valve V6. The hydraulic fluid from the first pressure-oil delivery port P1 is supplied to neither the first traveling control valve V5 nor the dozer second control valve V6, and the hydraulic fluid from the second pressure-oil delivery port P2 is supplied to neither the second traveling control valve V4 nor the dozer first control valve V3.

When the traveling independent valve V14 is switched to be in the merging position 28, the hydraulic fluid from the first pressure-oil delivery port P1 and the hydraulic fluid from the second pressure-oil delivery port P2 are merged and can be supplied to the directional switching valves DV1 to DV10 of the control valves V1 to V10.

The third pressure-oil delivery port P3 is connected to the inlet block B2 by a third delivery path m, and the third delivery path m branches into a first branch fluid passage m1 and a second branch fluid passage m2 at a position partway along its length and is connected to the inlet block B2.

The first branch fluid passage m1 is connected to a pressure receiver 14*a* located on one side of the traveling independent valve V14 by a first signal fluid passage n1, and the second branch fluid passage m2 is connected to a pressure receiver 14*b* located on the other side of the traveling independent valve V14 by a second signal fluid passage n2.

A first detection fluid passage r1 is connected to the first signal fluid passage n1, and a second detection fluid passage r2 is connected to the second signal fluid passage n2.

The first detection fluid passage r1 is connected to the drain fluid passage g via the first signal fluid passage n1, the directional switching valve DV6 of the dozer second control valve V6, the directional switching valve DV5 of the first traveling control valve V5, the directional switching valve DV4 of the second traveling control valve V4, and the directional switching valve DV3 of the dozer first control valve V3.

The second detection fluid passage r2 is connected to the drain fluid passage g via the second signal fluid passage n2, the directional switching valve DV10 of the SP control valve V10, the directional switching valve DV9 of the swing control valve V9, the directional switching valve DV8 of the slew control valve V8, the directional switching valve DV7 of the arm control valve V7, the directional switching valve DV6 of the dozer second control valve V6, the directional switching valve DV5 of the first traveling control valve V5, the directional switching valve DV4 of the second traveling control valve V4, the directional switching valve DV3 of the dozer first control valve V3, the directional switching valve DV2 of the boom control valve V2, and the directional switching valve DV1 of the working-tool control valve V1.

When the directional switching valves DV1 to DV10 of the control valves V1 to V10 are each in a neutral position, the traveling independent valve V14 is held in the merging position 28 by a spring force.

When any one of the directional switching valves DV of the second traveling control valve V4, the first traveling control valve V5, the dozer first control valve V3, and the dozer second control valve V6 is operated from the neutral position, pressure is applied to the first detection fluid passage r1 and the first signal fluid passage n1, so that the traveling independent valve V14 is switched from the merging position 28 to the independent position 27.

Thus, in the case of only traveling, in the case of using the dozer device 7 while traveling, or in the case of only using the dozer device 7, the hydraulic fluid from the first pressure-oil delivery port P1 is supplied to the directional switching valves DV of the second traveling control valve V4 and the dozer first control valve V3, and the hydraulic fluid from the second pressure-oil delivery port P2 is supplied to the directional switching valves DV of the first traveling control valve V5 and the dozer first control valve V3.

In this case, when any one of the directional switching valve DV10 of the SP control valve V10, the directional switching valve DV9 of the swing control valve V9, the directional switching valve DV8 of the slew control valve V8, the directional switching valve DV7 of the arm control valve V7, the directional switching valve DV2 of the boom control valve V2, and the directional switching valve DV1 of the working-tool control valve V1 is operated from the neutral position, pressure is applied to the second detection fluid passage r2 and the second signal fluid passage n2, so that the traveling independent valve V14 is switched from the independent position 27 to the merging position 28.

In addition, in the case where the directional switching valves DV1 to DV10 of the control valves V1 to V10 are in their neutral positions, when any one of the directional switching valve DV10 of the SP control valve V10, the directional switching valve DV9 of the swing control valve V9, the directional switching valve DV8 of the slew control valve V8, the directional switching valve DV7 of the arm control valve V7, the directional switching valve DV2 of the boom control valve V2, and the directional switching valve DV1 of the working-tool control valve V1 is operated from the neutral position, the traveling independent valve V14 is in the merging position 28.

Thus, when the working machine 1 is not traveling or is traveling, simultaneous operations of the boom 15, the arm 16, the bucket 17, the swing bracket 14, the machine body 2, and the dozer device 7 can be performed.

The hydraulic system further includes an automatic idling control system (an AI system) that automatically operates an accelerator of the prime mover E1.

The AI system includes an AI switch (a pressure switch) 29 that is connected to the first branch fluid passage m1 and the second branch fluid passage m2 of the third delivery path m via a sensing fluid passage s and a shuttle valve V18, an electrical actuator that controls a governor of the prime mover E1, and a controller that controls the electrical actuator. The AI switch 29 is connected to the controller.

In the AI system, pressure is applied to neither the first branch fluid passage m1 nor the second branch fluid passage m2 when the directional switching valves DV1 to DV10 of the control valves V1 to V10 are in their neutral positions. Thus, the AI switch 29 is not pressure-activated, and in this state, the governor is automatically controlled by the electric actuator or the like so as to throttle down to a predetermined idling position.

When at least one of the directional switching valves DV1 to DV10 of the control valves V1 to V10 is operated, pressure is applied to the first branch fluid passage m1 or the second branch fluid passage m2, and this pressure is detected by the AI switch 29, so that the AI switch 29 is pressure-activated. Then, the controller transmits a command signal to the electrical actuator or the like, and the governor is automatically controlled by the electric actuator or the like so as to throttle up to a set acceleration position.

In addition, the hydraulic system employs a load sensing system.

The load sensing system of the present embodiment includes the pressure compensation valves V11 included in the control valves V1 to V10, the flow-rate compensation piston 24, which controls the swash plate of the first pump 21, the flow-rate compensation valve V17, which is included in the flow-rate controller 19, the first and second relief valves V12 and V15, and the first and second unloading valves V13 and V16. In addition, as the load sensing system of the present embodiment, an after-orifice type load sensing system in which the pressure compensation valves V11 are disposed downstream from the directional switching valves DV1 to DV10 in the direction in which the pressure oil is supplied is employed.

In the load sensing system, when a plurality of the hydraulic actuators ML, MR, MT, and C1 to C6 included in the working machine 1 are simultaneously operated, the pressure compensation valves V11 function as adjusters for the loads among the hydraulic actuators ML, MR, MT, and C1 to C6 so as to generate a pressure loss at each of the control valves V1 to V10 on a low load pressure side, the pressure loss being equivalent to the differential pressure from the highest load pressure, and the hydraulic fluid can flow (can be distributed) at a flow rate corresponding to the operation amount of the spool of each of the directional switching valves DV1 to DV10 regardless of the magnitude of the load. In other words, the load sensing system controls the first pump 21 such that the differential pressure obtained by subtracting the highest load pressure among the load pressures of the plurality of hydraulic actuators ML, MR, MT, and C1 to C6 from the delivery pressure of the first pump 21 becomes a constant pressure.

In addition, the load sensing system controls the delivery amount of the first pump 21 in accordance with the load pressure of each of the hydraulic actuators ML, MR, MT, and C1 to C6 included in the working machine 1 so as to cause the first pump 21 to deliver a hydraulic power required for load, so that the load sensing system can save power and improve operability.

Further details of the load sensing system of the present embodiment will now be described.

The load sensing system includes a PLS-signal fluid passage w that transmits the highest load pressure among the load pressures of the control valves V1 to V10 as a PLS signal pressure to the flow-rate compensation valve V17 and a PPS-signal fluid passage x that transmits the delivery pressure of the first pump 21 as a PPS signal pressure to the flow-rate compensation valve V17.

The PLS-signal fluid passage w is formed in such a manner as to extend from the first outlet block B1 to the second outlet block B3 through the valve body of the working-tool control valve V1, the valve body of the boom control valve V2, the valve body of the dozer first control valve V3, and the valve body of the second traveling control valve V4, across the traveling independent valve V14, and through the valve body of the first traveling control valve V5, the valve body of the dozer second control valve V6, the valve body of the arm control valve V7, the valve body of the slew control valve V8, the valve body of the swing control valve V9, and the valve body of the SP control valve V10. The PLS-signal fluid passage w is connected, in each of the control valves, to the pressure compensation valves V11 by a load transmission line y.

In addition, the PLS-signal fluid passage w extends from the second outlet block B3 so as to be connected to one side of the spool of the flow-rate compensation valve V17, and the PPS signal pressure is applied to the one side of the spool of the flow-rate compensation valve V17.

Furthermore, the PLS-signal fluid passage w is connected to the first unloading valve V13 and the drain fluid passage g in the first outlet block B1 and connected to the second unloading valve V16 and the drain fluid passage g in the second outlet block B3.

When the traveling independent valve V14 is in the merging position 28, a line w1 of the PLS-signal fluid passage w that extends from the traveling independent valve V14 to the first outlet block B1 and a line w2 of the PLS-signal fluid passage w that extends from the traveling independent valve V14 to the second outlet block B3 communicate with each other. When the traveling independent valve V14 is switched from the merging position 28 to the independent position 27, the PLS-signal fluid passage w is blocked by the traveling independent valve V14.

As a result, when the traveling independent valve V14 is switched to the independent position 27, the PLS-signal fluid passage w is split into the line w1 along which the hydraulic fluid is supplied from the first pressure-oil delivery port P1 and the line w2 along which the pressure oil is supplied from the second pressure-oil delivery port P2.

The PPS-signal fluid passage x is formed in such a manner as to extend from the traveling independent valve V14 to the other side of the spool of the flow-rate compensation valve V17. When the traveling independent valve V14 is in the merging position 28, the PPS-signal fluid passage x communicates with the second pressure-oil supply path e via a connection fluid passage z, and the PPS signal pressure (the delivery pressure of the first pump 21) is applied to the other side of the spool of the flow-rate compensation valve V17. When the traveling independent valve V14 is switched to the independent position 27, the PPS-signal fluid passage x communicates with the drain fluid passage g via a relief fluid passage q such that the PPS signal pressure becomes zero.

Note that a spring 30 and a differential pressure piston 31 that apply a control differential pressure to the flow-rate compensation valve V17 are provided on the one side of the spool of the flow-rate compensation valve V17.

In the hydraulic system having the above-described configuration, when the directional switching valves DV1 to DV10 of the control valves V1 to V10 are in their neutral positions, the traveling independent valve V14 is in the merging position 28. In this case, a flow-path end side of the first pressure-oil supply path d is blocked by the first unloading valve V13, and a flow-path end side of the second pressure-oil supply path e is blocked by the second unloading valve V16. Thus, when the delivery pressure (the PPS signal pressure) of the first pump 21 increases, and the difference between the PPS signal pressure and the PLS signal pressure (which is zero in this state) becomes larger than the control differential pressure, the flow rate of the first pump 21 is flow-rate-controlled such that its delivery amount is reduced, and the first and second unloading valves V13 and V16 are opened such that the hydraulic fluid delivered from the first pump 21 flows down to the hydraulic-fluid tank T2.

Thus, in this state, the delivery pressure of the first pump 21 is a pressure that is set by the first and second unloading valves V13 and V16, and the delivery flow rate of the first pump 21 is a minimum delivery amount.

Next, a case where any two or more of the boom cylinder C3, the arm cylinder C4, the working-tool cylinder C5, the swing cylinder C2, the slewing motor MT, and the hydraulic attachment are simultaneously operated or a case where one or more of these and any one or more of the left and right traveling motors ML and MR and the dozer cylinder C1 are simultaneously operated will be described.

In either case, the traveling independent valve V14 is in the merging position 28. The highest load pressure applied to the operated hydraulic actuators ML, MR, MT, and C1 to C6 is the PLS signal pressure. The delivery pressure (the delivery flow rate) of the first pump 21 is automatically controlled such that the difference between the PLS signal pressure and the PPS signal pressure is equal to the control differential pressure (such that the difference between the PPS signal pressure and the PLS signal pressure is maintained at a set value).

In other words, when an unloading flow rate through the first and second unloading valves V13 and V16 becomes zero, the delivery flow rate of the first pump 21 starts to increase, and the entire amount of the hydraulic fluid delivered from the first pump 21 flows into the operated hydraulic actuators ML, MR, MT, and C1 to C6 in accordance with the operation amounts of the operated control valves.

The pressure compensation valves V11 make the differential pressure across the spools of the directional switching valves DV1 to DV10 of the operated control valves V1 to V10 constant, and regardless of the difference in magnitude among the loads applied to the operated hydraulic actuators ML, MR, MT, and C1 to C6, the first pump 21 distributes the hydraulic fluid to each of the operated hydraulic actuators ML, MR, MT, and C1 to C6 at the delivery flow rate in accordance with the corresponding operation amount.

Note that, in the case where the flow rate required for the hydraulic actuators ML, MR, MT, and C1 to C6 exceeds the maximum delivery flow rate of the first pump 21, the hydraulic fluid delivered from the first pump 21 is proportionally allocated to the operated hydraulic actuators ML, MR, MT, and C1 to C6.

In the above case, simultaneous operations (combined operations) can be performed by using an efficient system.

In the case where earthwork is performed by the dozer device 7 while traveling, the traveling independent valve V14 is switched to the independent position 27, and the communication path j and the PLS-signal fluid passage w are blocked by the traveling independent valve V14. The PPS-signal fluid passage x communicates with the drain fluid passage g via the relief fluid passage q, and the PPS signal pressure becomes zero.

Thus, the hydraulic fluid from the first pressure-oil delivery port P1 flows into the second traveling control valve V4 and the dozer first control valve V3 and does not flow into either the first traveling control valve V5 or the dozer second control valve V6. The hydraulic fluid from the second pressure-oil delivery port P2 flows into the first traveling control valve V5 and the dozer second control valve V6 and does not flow into either the second traveling control valve V4 or the dozer first control valve V3. In addition, since the PPS signal pressure is zero, the angle of the swash plate of the first pump 21 becomes maximum, and the first pump 21 delivers the maximum flow rate.

Figure 8:
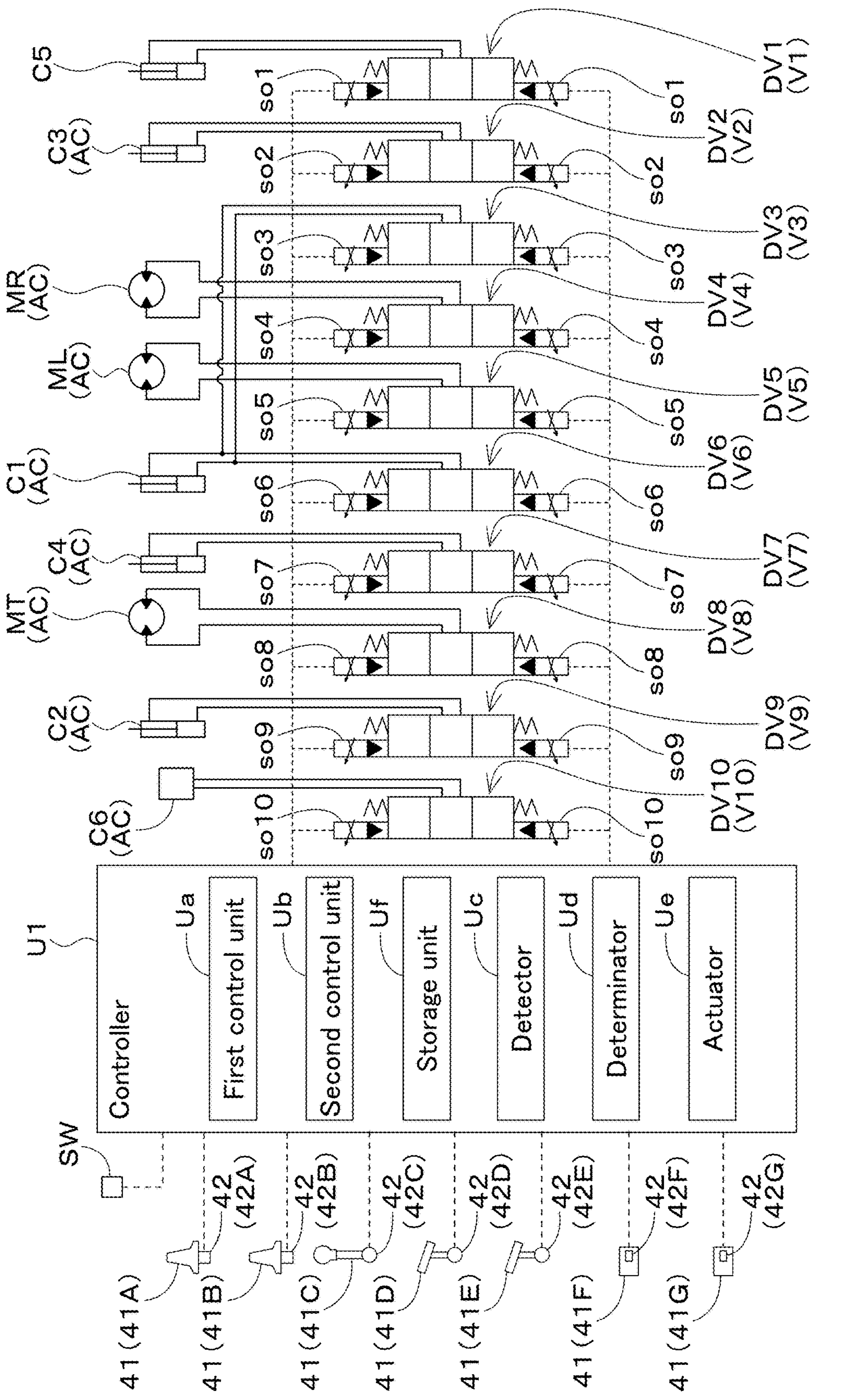
FIG. 8 is a simplified diagram of a control system.

As illustrated in FIG. 8, proportional solenoids so1 to so10 of the directional switching valves DV1 to DV10 are connected to the controller U1. The directional switching valves DV1 to DV10 (the control valves V1 to V10) are pilot-operated by pilot control pressures corresponding to control signals that are transmitted from the controller U1 to the proportional solenoids so1 to so10 (the values of currents supplied to the proportional solenoids so1 to so10) such that the flow direction and the flow rate of the hydraulic fluid with respect to the hydraulic actuators ML, MR, MT, and C1 to C6, which are control targets, are controlled. In other words, each of the control valves V1 to V10 is pilot-operated by a pilot control pressure that is controlled by a control signal transmitted by the controller U1. That is to say, each of the control valves V1 to V10 is controlled in accordance with the value of a current supplied thereto from the controller U1.

Operation members 41 (first operation actuator 41A to seventh operation actuator 41G) that operate the directional switching valves DV1 to DV10 (the control valves V1 to V10) (that receive operation instructions for the hydraulic actuators ML, MR, MT, and C1 to C6) are connected to the controller U1. The controller U1 supplies (transmits) currents (control signals) having a value corresponding to the operation amounts of the operation members 41 the proportional solenoids so1 to so10 of the directional switching valves DV1 to DV10, which are operation targets. In other words, the controller U1 controls actuations of the control valves V1 to V10 in response to the operations performed on the operation members 41.

The first operation actuator 41A and the second operation actuator 41B are included in the manipulator 1B and each include, for example, a handle that is to be held and operated by an operator in the operator's seat 6.

The first operation actuator 41A is capable of operating two of the operation targets included in the working machine 1. For example, the first operation actuator 41A can operate the directional switching valve DV8 (the slewing motor MT) (can cause the machine body 2 to turn) and can operate the directional switching valve DV7 (the arm cylinder C4) (can cause the arm 16 to swing). The first operation actuator 41A includes a sensor (an operation detector) 42 (i.e., a first sensor 42A) that detects an operation direction and an operation amount thereof. The first sensor 42A is connected to the controller U1. The controller U1 controls the slew control valve V8 (the machine body 2) and the arm control valve V7 (the arm 16) on the basis of a detection signal from the first sensor 42A.

Also the second operation actuator 41B is capable of operating two of the operation targets included in the working machine 1. For example, the second operation actuator 41B can operate the directional switching valve DV2 (the boom cylinder C3) (can cause the boom 15 to swing) and can operate the directional switching valve DV1 (the working-tool cylinder C5) (can cause the working tool (bucket) 17 to swing). The second operation actuator 41B includes a sensor (an operation detector) 42 (i.e., a second sensor 42B) that detects an operation direction and an operation amount thereof. The second sensor 42B is connected to the controller U1. The controller U1 controls the boom control valve V2 (the boom 15) and the working-tool control valve V1 (the bucket 17) on the basis of a detection signal from the second sensor 42B.

The first operation actuator 41A and the second operation actuator 41B are each swingable in the front and rear directions K1 and the machine-body width direction K2. For example, when the first operation actuator 41A is swung forward from the neutral position, the arm 16 moves in the arm-dump direction D2, and when the first operation actuator 41A is swung rearward, the arm 16 moves in the arm-crowd direction D1. When the first operation actuator 41A is swung leftward from the neutral position, the machine body 2 turns to the left, and when the first operation actuator 41A is swung rightward, the machine body 2 turns to the right. When the second operation actuator 41B is swung forward from the neutral position, the boom 15 swings downward, and when the second operation actuator 41B is swung rearward, the boom 15 swings upward. When the second operation actuator 41B is swung leftward from the neutral position, the bucket (working tool) 17 moves in the bucket-crowd direction D3, and when the second operation actuator 41B is swung rightward, the bucket (working tool) 17 moves in the bucket-dump direction D4.

The third operation actuator 41C is included in the manipulator 1B and includes, for example, a lever. The third operation actuator 41C can operate the directional switching valve DV3 and the directional switching valve DV6 (the dozer cylinder C1) (can operate the dozer device 7). The third operation actuator 41C includes a sensor 42 (a third sensor 42C) that detects an operation direction and an operation amount thereof. The third sensor 42C is connected to the controller U1. The controller U1 controls the dozer first control valve V3 and the dozer second control valve V6 (the dozer device 7) on the basis of a detection signal from the third sensor 42C.

The fourth operation actuator 41D and the fifth operation actuator 41E are provided on, for example, a floor portion located in front of the operator's seat 6 and each include a pedal that is operated by being stepped on by the operator.

The fourth operation actuator 41D can operate the directional switching valve DV5 (the first traveling motor ML) (can operate the first traveling device 3L). The fourth operation actuator 41D includes a sensor 42 (a fourth sensor 42D) that detects an operation direction and an operation amount thereof. The fourth sensor 42D is connected to the controller U1. The controller U1 controls the first traveling control valve V5 (the first traveling device 3L) on the basis of a detection signal from the fourth sensor 42D.

The fifth operation actuator 41E can operate the directional switching valve DV4 (the second traveling motor MR) (can operate the second traveling device 3R). The fifth operation actuator 41E includes a sensor 42 (a fifth sensor 42E) that detects an operation direction and an operation amount thereof. The fifth sensor 42E is connected to the controller U1. The controller U1 controls the second traveling control valve V4 (the second traveling device 3R) on the basis of a detection signal from the fifth sensor 42E.

The sixth operation actuator 41F includes, for example, a switch (such as a rocker switch or a slide switch) that is included in the first operation actuator 41A or the second operation actuator 41B. The sixth operation actuator 41F can operate the directional switching valve DV9 (the swing cylinder C2) (can operate the swing bracket 14). The sixth operation actuator 41F includes a sensor 42 (a sixth sensor 42F) that detects an operation direction and an operation amount thereof. The sixth sensor 42F is connected to the controller U1. The controller U1 controls the swing control valve V9 (the swing bracket 14) on the basis of a detection signal from the sixth sensor 42F.

The seventh operation actuator 41G includes, for example, a switch (such as a rocker switch or a slide switch) that is included in the first operation actuator 41A or the second operation actuator 41B. The seventh operation actuator 41G can operate the directional switching valve DV10 (the hydraulic actuator of the hydraulic attachment) (can operate the hydraulic attachment serving as the working tool). The seventh operation actuator 41G includes a sensor 42 (a seventh sensor 42G) that detects an operation direction and an operation amount thereof. The seventh sensor 42G is connected to the controller U1. The controller U1 controls the SP control valve V10 (the hydraulic attachment) on the basis of a detection signal from the seventh sensor 42G.

Although the configuration of each of the sensors 42 (the first sensor 42A to the seventh sensor 42G) is not particularly limited, for example, a potentiometer or the like may be used.

The spools of the directional switching valves DV1 to DV10 are moved in proportion to the operation amounts of the operation members 41 that operate the directional switching valves DV1 to DV10 (the control valves V1 to V10) such that each of the hydraulic actuators ML, MR, MT, and C1 to C6, which are control targets, receives the hydraulic fluid the amount of which is proportional to the amount of actuation of a corresponding one of the directional switching valves DV1 to DV10. In other words, the operating speed of each of the operation targets (each of the control targets) is variably adjustable in proportion to the operation amount of the corresponding operation member 41.

As described above, the control valves V1 to V10 are operated by operating the operation members 41, and as a result, their respective the hydraulic actuators ML, MR, MT, and C1 to C6 are operated. Then, driving targets (the machine body 2, the traveling device 3, the dozer device 7, the boom 15, the arm 16, the working tool 17, and the hydraulic attachment) are driven by the hydraulic actuators ML, MR, MT, and C1 to C6.

As illustrated in FIG. 8, the controller U1 includes a first control unit Ua, a second control unit Ub, and a storage unit Uf.

The first control unit Ua controls the working-tool control valve V1 when the working-tool cylinder C5 (the working-tool control valve V1) is solely operated (independently operated). In other words, when the working-tool cylinder C5 is independently operated, the first control unit Ua controls the flow rate of the hydraulic fluid (also referred to as "hydraulic-fluid flow rate") of hydraulic fluid supplied from the working-tool control valve V1 to the working-tool cylinder C5 with respect to the operation amount of the working-tool cylinder C5.

The second control unit Ub controls the working-tool control valve V1 when the working-tool cylinder C5 (the working-tool control valve V1) and the other hydraulic actuator AC (at least one of the traveling motor M1, the slewing motor MT, the dozer cylinder C1, the swing cylinder C2, the boom cylinder C3, the working-tool cylinder C5, the arm cylinder C4, and the attachment actuator C6) that is different from the working-tool cylinder C5 are simultaneously operated (operated in combination). In other words, when the working-tool cylinder C5 and at least one of the other hydraulic actuators AC are operated in combination, the second control unit Ub controls the hydraulic-fluid flow rate of hydraulic fluid supplied from the working-tool control valve V1 to the working-tool cylinder C5 with respect to the operation amount of the working-tool cylinder C5.

The second control unit Ub performs (executes) second control for controlling the actuation of the control valve (the working-tool control valve V1) on the basis of the amount of the operation performed on at least one of the operation members 41 and the correspondence between a preset operation amount for the at least one operation member 41 and the actuation amount of the control valve (the working-tool control valve V1). The first control unit Ua performs (executes), in accordance with the amount of the operation performed on the at least one operation member 41, first control for controlling the actuation of the control valve (the working-tool control valve V1) in such a manner that the flow rate of the hydraulic fluid supplied from the control valve (the working-tool control valve V1) to the hydraulic actuator (the working-tool cylinder C5) increases to be greater than that in the case of the second control.

In other words, the controller U1 performs the first control when the operation state is a single operation of the hydraulic actuator (the working-tool cylinder C5), and the controller U1 performs the second control when the operation state is a combined operation of the hydraulic actuator (the working-tool cylinder C5) and at least one of the other hydraulic actuators AC. That is to say, the controller U1 can execute the second control and the first control, and when the operation performed on the at least one operation member 41 is in a predetermined operation state, the controller U1 performs the first control.

Note that the target that is controlled by the first control unit Ua and the second control unit Ub is not limited to the working-tool control valve V1 and may be, for example, the boom cylinder C3, the arm cylinder C4, the dozer cylinder C1, or the like. In addition, the number of targets to be controlled may be at least one.

The storage unit Uf (the controller U1) stores a first characteristic line 55 in the case where control is performed by the first control unit Ua (the first control is performed) and a second characteristic line 56 in the case where control is performed by the second control unit) Ub (the second control is performed).

Figure 9A:
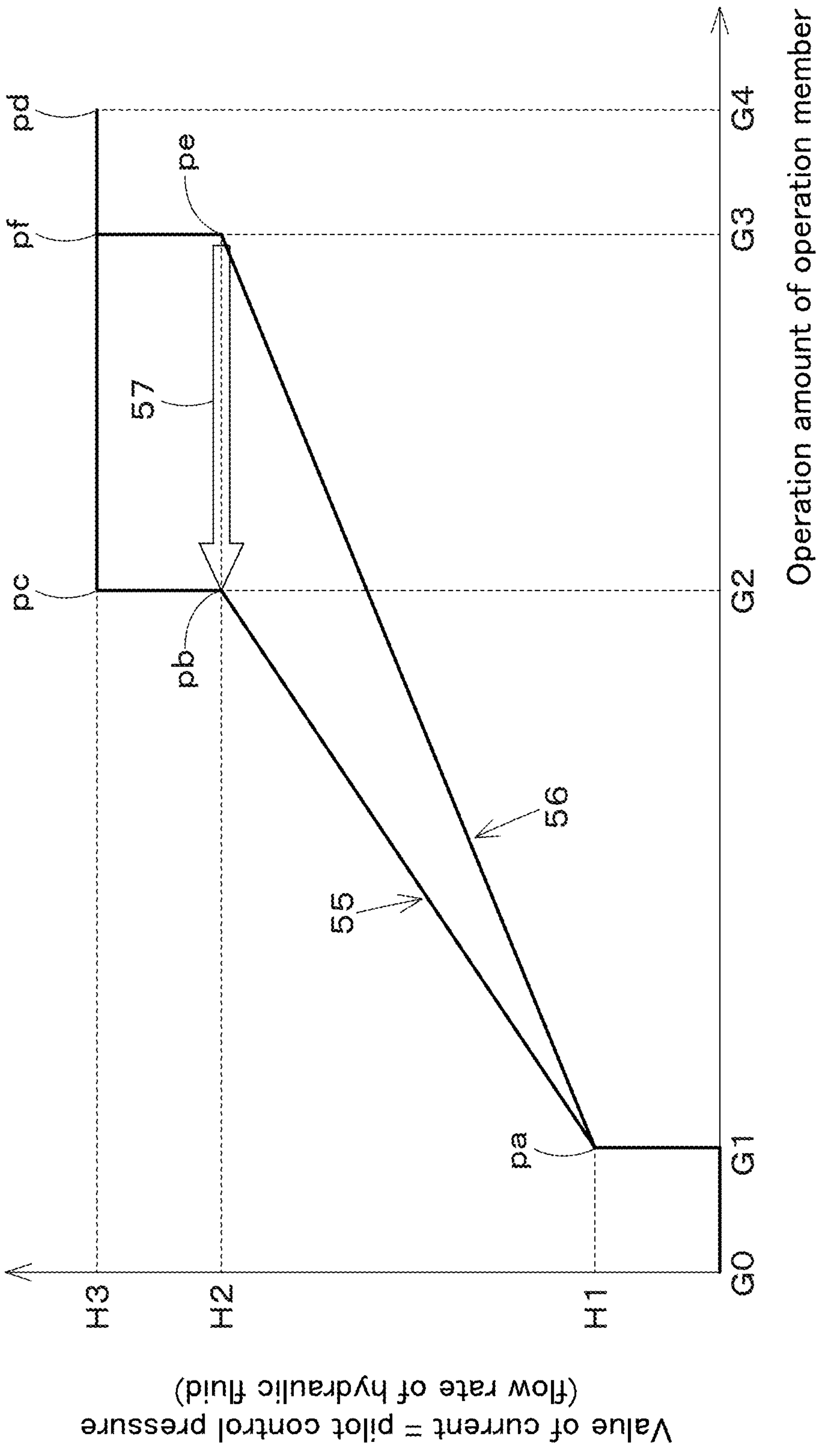
FIG. 9A is a graph illustrating a relationship between an operation amount of an operation member and a value of a current.

FIG. 9A is a graph illustrating the relationship between the operation amount of the operation member 41 (the second operation actuator 41B) and the value of a current (a hydraulic-fluid flow rate). The horizontal axis denotes the operation amount of the operation member 41 (the second operation actuator 41B). The vertical axis denotes the value of the current supplied to the working-tool control valve V1, that is, the pilot control pressure for pilot-operating the working-tool control valve V1 (the flow rate of the hydraulic fluid supplied from the working-tool control valve V1 to the working-tool cylinder C5).

In FIG. 9A, the current value (hydraulic-fluid flow rate) increases with increasing distance from the origin of the graph. The operation amount of the operation member 41 is zero at the origin of the graph and increases with increasing distance from the origin. An operation amount G0 is a starting point of the operation of the operation member 41 (in a non-operating state) and is zero. In other words, it is the operation amount when the operation member 41 is in the neutral position. A region from the operation amount G0 to an operation amount G1 is a dead region (neutral zone) in which the current value (hydraulic-fluid flow rate) is zero and in which the bucket 17 does not move even when the operation member 41 (the second operation actuator 41B) is operated. At the operation amount G1 the current value (hydraulic-fluid flow rate) abruptly increases from zero to H1.

The phrase "abruptly increases" refers to the case where only the current value (hydraulic-fluid flow rate) increases while the operation amount of the operation member 41 remains unchanged (while the operating position of the operation member 41 remains unchanged) as illustrated in FIG. 9A, that is, only the current value (hydraulic-fluid flow rate) shifts upward in parallel with the vertical axis while the operation amount of the operation member 41 remains unchanged in FIG. 9A.

The first characteristic line (pa-pb-pc-pd) 55 in FIG. 9A indicates the case where the first control unit Ua controls the value of the current supplied to the solenoid so1 of the working-tool control valve V1 (the flow rate of the hydraulic fluid supplied from the working-tool control valve V1 to the working-tool cylinder C5 with respect to changes in the operation amount of the operation member 41). In other words, it indicates changes in the current value (hydraulic-fluid flow rate) corresponding to the operation amount of the operation member 41 when the working-tool cylinder C5 is independently operated.

The second characteristic line (pa-pe-pf-pd) 56 in FIG. 9A indicates the case where the second control unit Ub controls the value of the current supplied to the solenoid so1 of the working-tool control valve V1 (the hydraulic-fluid flow rate of hydraulic fluid supplied from the working-tool control valve V1 to the working-tool cylinder C5 with respect to the operation amount of the operation member 41). In other words, it indicates changes in the current value (hydraulic-fluid flow rate) corresponding to changes in the operation amount of the operation member 41 when the working-tool cylinder C5 and at least one of the other hydraulic actuators AC are operated in combination.

The first characteristic line 55 and the second characteristic line 56 are stored in the storage unit Uf. In other words, the controller U1 includes the storage unit Uf that stores the first characteristic line 55 and the second characteristic line 56.

Starting ends (points pa) of the first and second characteristic lines 55 and 56 are at the same position. The operation amount of the operation member 41 at the starting ends pa of the first and second characteristic lines 55 and 56 is G1, and the current value (hydraulic-fluid flow rate) at the starting ends pa is H1. In addition, the first characteristic line 55 and the second characteristic line 56 each have a slope inclined upward to the right from the point pa. The slope of the first characteristic line 55 is set to be greater than the slope of the second characteristic line 56. In other words, the degree of change in the current value with respect to the changes in the operation amount of the operation member 41 in the first characteristic line 55 is set to be greater than the degree of change in the current value with respect to the changes in the operation amount of the operation member 41 in the second characteristic line 56. That is to say, the first control unit Ua performs control such that the flow rate of the hydraulic fluid with respect to the operation amount of the operation member 41 is greater than that in the case where the second control unit Ub performs control.

In the first characteristic line 55, when the operation member 41 is operated from the operation amount G1 to an operation amount G2, the current value (hydraulic-fluid flow rate) increases with an upward slope toward the right from the point pa to a point pb and becomes H2, and the current value (hydraulic-fluid flow rate) abruptly increases from H2 to a maximum current value (a maximum flow rate) H3 (a point pc) at the point pb (the position of the operation amount G2). After that, the current value (hydraulic-fluid flow rate) transitions from the point pc to a point pd (a full operation amount G4 that is an end point of the operation of the operation member 41 (a fully-operated position)) at the maximum current value (maximum flow rate) H3.

In the second characteristic line 56, when the operation member 41 is operated from the operation amount G1 to an operation amount G3, the current value (hydraulic-fluid flow rate) increases with an upward slope toward the right from the point pa to a point pe and becomes H2, and the current value (hydraulic-fluid flow rate) abruptly increases from H2 to the maximum current value (maximum flow rate) H3 (a point pf) at the point pe (the position of the operation amount G3). After that, the current value (hydraulic-fluid flow rate) After that, the current value (hydraulic-fluid flow rate) transitions from the point pf to the point pd (the full operation amount G4) at the maximum current value (maximum flow rate) H3.

In the present embodiment, the flow rate of the hydraulic fluid supplied from the working-tool control valve V1 to the working-tool cylinder C5 is increased by increasing the pilot control pressure that is controlled by a control signal transmitted from the controller U1 to the working-tool control valve V1. In other words, the controller U1 increases the value of the current supplied to the working-tool control valve V1, so that the flow rate of the hydraulic fluid supplied from the working-tool control valve V1 to the working-tool cylinder C5 is increased.

As seen from the first characteristic line 55 and the second characteristic line 56 in FIG. 9A, in the case where the operation amount of the operation member 41 when the working-tool cylinder C5 (the working-tool control valve V1) is solely operated and the operation amount of the operation member 41 when the working-tool cylinder C5 and at least one of the other actuators AC are operated in combination are the same, the current value (the flow rate of the hydraulic fluid supplied from the working-tool control valve V1 to the working-tool cylinder C5) when the working-tool cylinder C5 (the working-tool control valve V1) is solely operated is greater than that when the working-tool cylinder C5 and at least one of the other hydraulic actuators AC are operated in combination. In other words, when the working-tool cylinder C5 is independently operated, the flow rate of the hydraulic fluid supplied to the working-tool cylinder C5 with respect to the operation amount of the operation member 41 (the second operation actuator 41B) increases. That is to say, in the case of the same operation amount of the operation member 41, the first control unit Ua causes the hydraulic fluid to be supplied from the working-tool control valve V1 to the working-tool cylinder C5 at a flow rate greater than the flow rate of the hydraulic fluid controlled by the second control unit Ub.

As illustrated in FIG. 9A, the operation amount G2 at the point pb of the first characteristic line 55 is less than the operation amount G3 at the point pe of the second characteristic line 56. In other words, the controller U1 sets the operation amount G2 of the operation member 41 with the maximum current value H3 in the first characteristic line 55 to be less than the operation amount G3 of the operation member 41 with the maximum current value H3 in the second characteristic line 56. As a result, the slope of the first characteristic line 55 is greater than the slope of the second characteristic line 56, and the flow rate of the hydraulic fluid controlled by the first control unit Ua in accordance with the operation amount of the operation member 41 is increased to be greater than that controlled by the second control unit Ub. The position of the point pb can be freely changed. By changing the position of the point pb, a distance 57 between the point pe and the point pb is changed, so that the slope of the first characteristic line 55 can be changed. In other words, some leeway can be given to the change in the slope of the first characteristic line 55.

There is a bucket called a skeleton bucket as the working tool 17. The skeleton bucket is a bucket in which a portion of the bucket 17 is formed to have holes arranged in a grid pattern such that a portion of a material scooped by the bucket 17 falls off through the holes. In the case of performing a sieving operation by causing the skeleton bucket to swing back and forth (bucket shaking), the operation member 41 (the second operation actuator 41B) is swung from side to side at high speed (quickly). Swinging the operation member 41 from side to side corresponds to, for example, fully operating the operation member 41 from the neutral position to the bucket-crowd side, returning it to the neutral position, then fully operating the operation member 41 to the bucket-dump side, and returning it to the neutral position. When the operation member 41 is swung from side to side at high speed, the actuation of the working-tool control valve V1 (movement of the spool) may sometimes fail to keep pace with the operation of the operation member 41, resulting in poor response from the bucket 17. More specifically, if the operation member 41 is swung from side to side at high speed, the spool of the working-tool control valve V1 does not always move at full stroke in response to the movement of the operation member 41, and thus, the amount of hydraulic fluid supplied to the working-tool cylinder C5 becomes insufficient, resulting in poor response from the bucket 17.

In the present embodiment, when the bucket 17 is independently operated, the first control unit Ua perform control for increasing the hydraulic-fluid flow rate with respect to the operation amount of the working-tool cylinder C5 (the working-tool control valve V1). Thus, for example, when the working-tool control valve V1 is operated by swinging the operation member 41 from side to side at high speed, the hydraulic-fluid flow rate with respect to the operation amount of the operation member 41 can be ensured, and the responsiveness of the bucket 17 can be ensured.

Figure 9B:
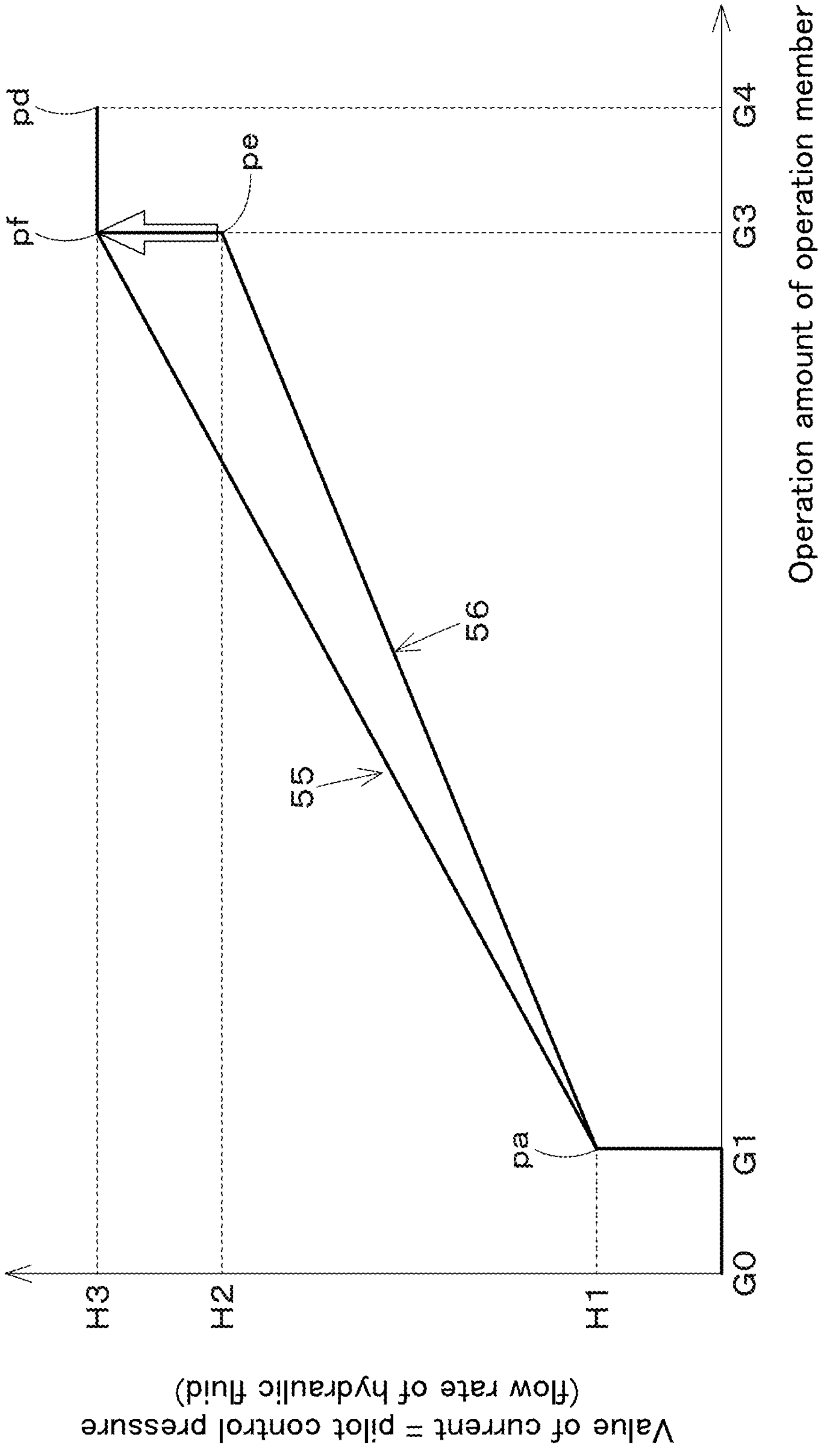
FIG. 9B is a graph illustrating a relationship between the operation amount of the operation member and the value of the current.

In the present embodiment, as illustrated in FIG. 9A, the operation amount G2 at the point pb of the first characteristic line 55 is set to be less than the operation amount G3 at the point pe of the second characteristic line 56, so that the first control unit Ua is configured to increase the hydraulic-fluid flow rate with respect to the operation amount of the operation member 41 more than the second control unit Ub does. However, the present invention is not limited to this. For example, the first characteristic line 55 and the second characteristic line 56 may be set as illustrated in FIG. 9B. In FIG. 9B, the current value corresponding to the operation amount of the operation member 41 is set to be greater in the first characteristic line 55 than in the second characteristic line 56 until the operation amount of the operation member 41 reaches the predetermined operation amount G3 that is less than the maximum operation amount G4. The current value in the second characteristic line 56 is set to be the same as the maximum current value H3 in the first characteristic line 55 when the operation amount of the operation member 41 exceeds the predetermined operation amount G3.

More specifically, similar to FIG. 9A, in the second characteristic line 56 (pa-pe-pd) illustrated in FIG. 9B, when the operation member 41 is operated from the operation amount G1 to the operation amount G3 less than the full operation amount G4, which is the end point of the operation of the operation member 41, (an operation amount near the full operation amount G4), the current value (hydraulic-fluid flow rate) increases with an upward slope toward the right from the point pa to the point pe and becomes H2, and the current value (hydraulic-fluid flow rate) abruptly increases from H2 to the maximum current value (maximum flow rate) H3 (the point pf) at the position of the operation amount G3 (the point pe). After that, the current value (hydraulic-fluid flow rate) After that, the current value (hydraulic-fluid flow rate) transitions from the point pf to the point pd (the operation amount G4) at the maximum current value (maximum flow rate) H3.

In contrast, in the first characteristic line 55 (pa-pf-pd), when the operation member 41 is operated from the operation amount G1 to the operation amount G3, the current value (hydraulic-fluid flow rate) increases with an upward slope toward the right from the point pa to the point pf and becomes the maximum current value (maximum flow rate) H3. After that, the current value (hydraulic-fluid flow rate) transitions from the point pf to the point pd (the operation amount G4) at the maximum current value (maximum flow rate) H3.

In other words, the second characteristic line 56 reaches the current value H2 that is less than the maximum current value H3 at the operation amount G3 that is less than the full operation amount G4, which is the end point of the operation of the operation member 41, and then abruptly increases to the maximum current value H3, and the first characteristic line 55 reaches the maximum current value H3 at the above-mentioned operation amount G3, which is less than the full operation amount G4.

Figure 9C:
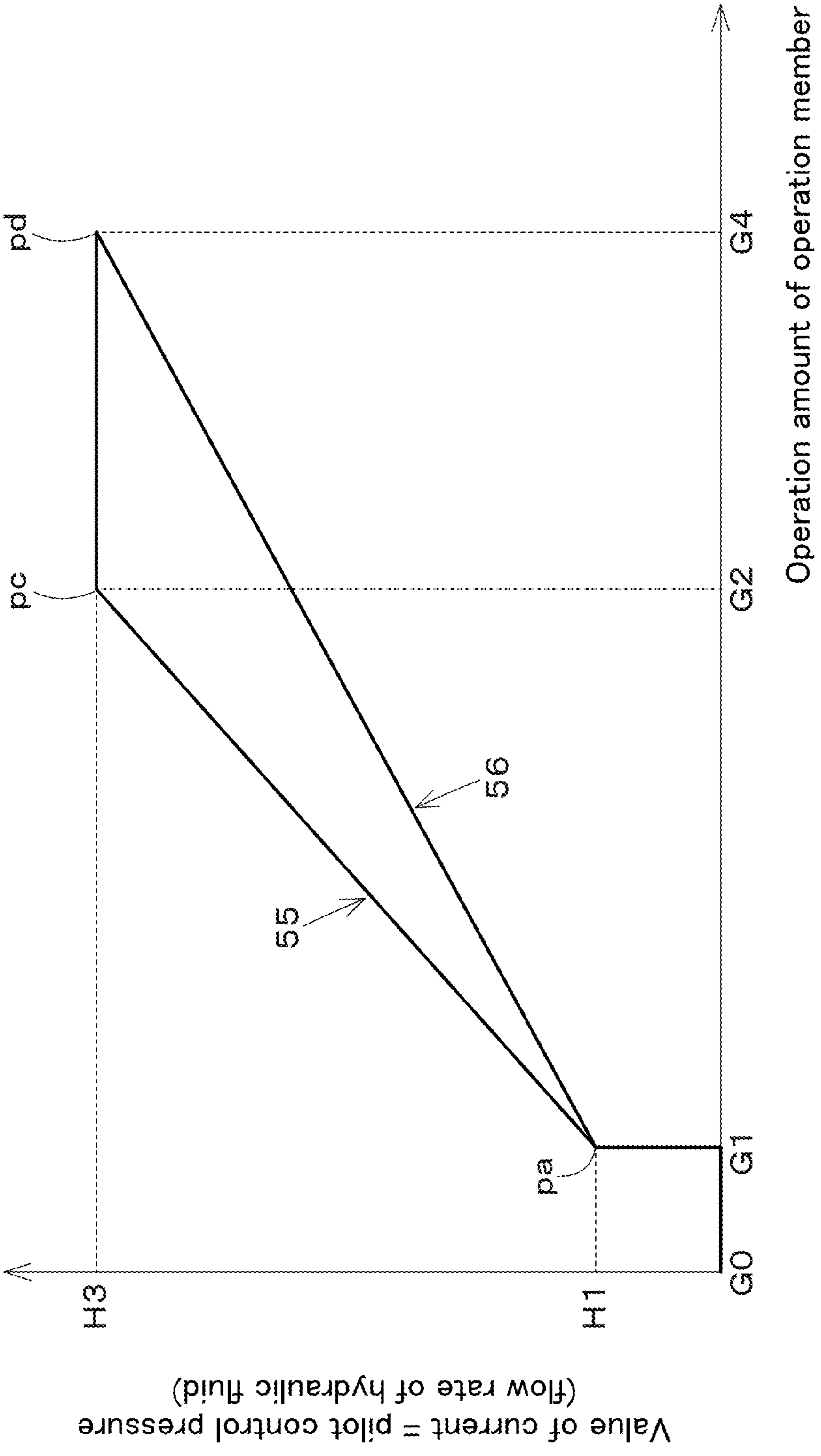
FIG. 9C is a graph illustrating a relationship between the operation amount of the operation member and the value of the current.

Alternatively, the first characteristic line 55 and the second characteristic line 56 may be set as illustrated in FIG. 9C. In FIG. 9C, when the first control is selected by a selector switch SW, the controller U1 sets the current value corresponding to the operation amount of the operation member 41 to the maximum current value H3.

More specifically, as illustrated in FIG. 9C, in the first characteristic line 55, when the operation member 41 is operated from the operation amount G1 to the operation amount G2, the current value (hydraulic-fluid flow rate) increases with an upward slope toward the right from the point pa and reaches the maximum current value (maximum flow rate) H3 at the operation amount G2. After that, the current value (hydraulic-fluid flow rate) transitions at the maximum current value (maximum flow rate) H3 to the operation amount G4. In addition, in the second characteristic line 56, when the operation member 41 is operated from the operation amount G1 to the full operation amount G4, the current value (hydraulic-fluid flow rate) increases with an upward slope toward the right from the point pa and reaches the maximum current value (maximum flow rate) H3 at full operation amount G4.

In the above-described embodiment, when the working-tool cylinder C5 is independently operated, the first control unit Ua controls the flow rate of the hydraulic fluid with respect to the operation amount of the operation member 41, and when the working-tool cylinder C5 and at least one of the other hydraulic actuators AC are operated in combination, the second control unit Ub controls the flow rate of the hydraulic fluid with respect to the operation amount of the operation member 41. However, the present invention is not limited to this. In other words, there is no insistence on a single operation or a combined operation.

For example, as illustrated in FIG. 8, the selector switch SW may be provided, and the selector switch SW may switch between the case where the control of the flow rate of the hydraulic fluid with respect to the operation amount of the operation member 41 is performed by the first control unit Ua and the case where the control is performed by the second control unit Ub.

More specifically, the selector switch SW is connected to the controller U1, and the controller U1 can acquire a signal from the selector switch SW. When the selector switch SW is ON, the controller U1 causes the first control unit Ua to control the flow rate of the hydraulic fluid with respect to the operation amount of the operation member 41, and when the selector switch SW is OFF, the controller U1 causes the second control unit Ub to control the flow rate of the hydraulic fluid with respect to the operation amount of the operation member 41. In other words, the selector switch SW is a switch that receives an instruction to select between the first control and the second control, and the controller U1 performs the second control when an operation is performed on the operation member 41 in a state in which the second control is selected by the selector switch SW, and the controller U1 performs the first control when an operation is performed on the operation member 41 in a state in which the first control is selected by the selector switch SW.

In this case, in the case of performing bucket shaking or the like by operating the working-tool cylinder C5 independently, the selector switch SW may be switched ON, and other operations (e.g., a crane operation, or the like) that are performed by operating the working-tool cylinder C5 independently can each be performed at a stable speed by switching OFF the selector switch SW. In addition, when the selector switch SW is OFF, the control of the flow rate of the hydraulic fluid supplied to the working-tool cylinder C5 with respect to the operation amount of the operation member 41 is performed by the second control unit Ub even when the working-tool cylinder C5 and at least one of the other hydraulic actuators AC are operated in combination.

Figure 9D:
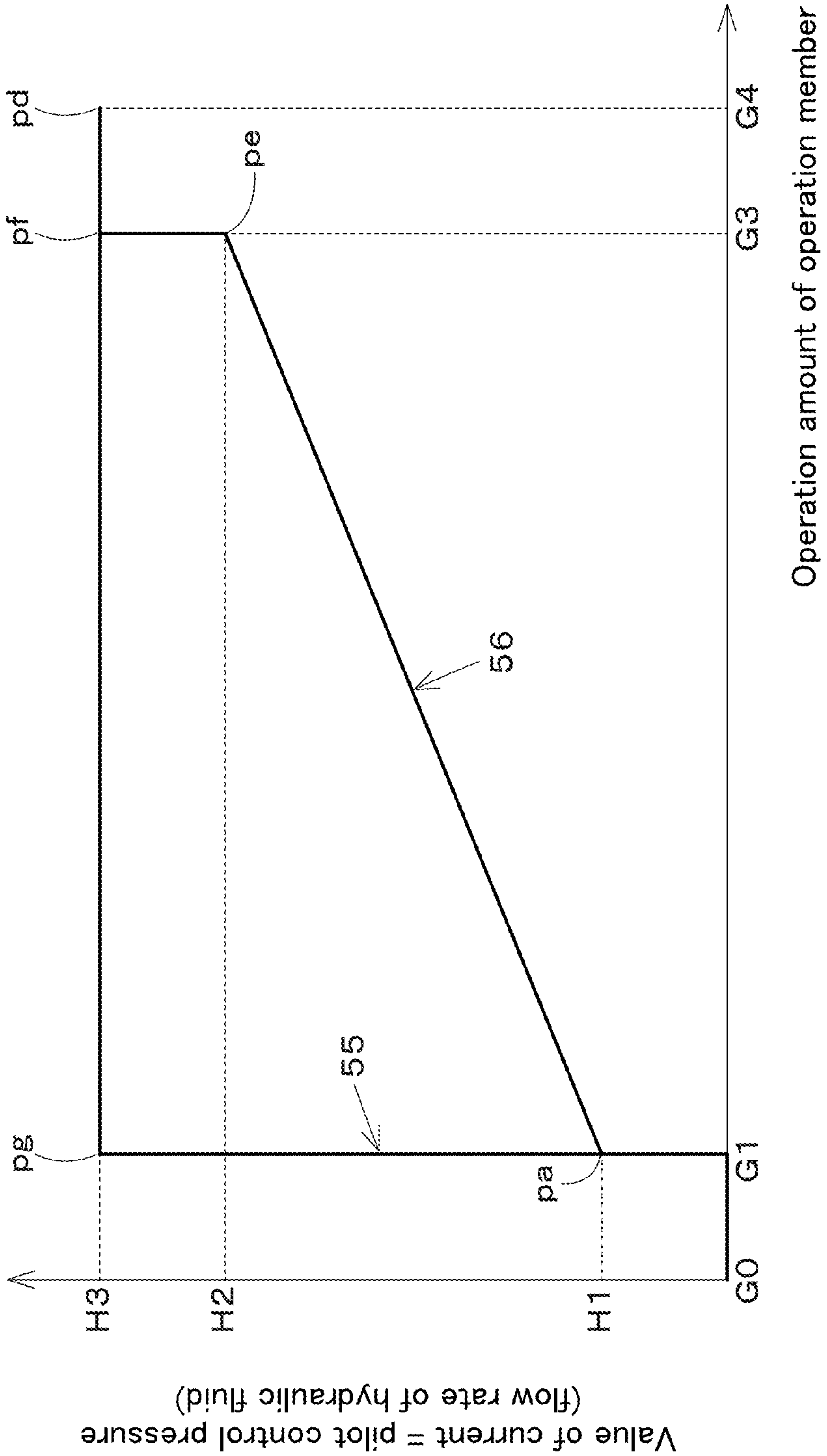
FIG. 9D is a graph illustrating a relationship between the operation amount of the operation member and the value of the current.

In addition, in this case, as illustrated in FIG. 9D, the first characteristic line 55 (pa-pg-pd) may be set to abruptly change from the starting end pa of the second control unit Ub to the point pg at the starting end pa so as to increase the current value (hydraulic-fluid flow rate) to the maximum current value (maximum flow rate) H3. In this manner, the responsiveness can be improved as much as possible.

When the selector switch SW is switched on, the controller U1 may cause the bucket (working tool) 17 to automatically swing back and forth. In other words, when the first control is selected by the selector switch SW, the controller U1 may automatically perform control for repeatedly reversing the operation direction of the hydraulic actuator (the working-tool cylinder C5). This eliminates the need for manual swinging of the operation member 41 from side to side, making it very convenient.

In addition, a specific operation state of the operation member 41 may be detected, and if the specific operation state is detected, the flow rate of the hydraulic fluid supplied to the working-tool cylinder C5 may be controlled by the first control unit Ua, and if the specific operation state is not detected, the flow rate of the hydraulic fluid supplied to the working-tool cylinder C5 may be controlled by the second control unit Ub.

More specifically, as illustrated in FIG. 8, the controller U1 may include a detector Uc, a determinator Ud, and an actuator Ue. Since the controller U1 can acquire a signal from the sensor 42 of the operation member 41, the detector Uc can detect the operation state of the operation member 41 by using the signal from the operation member 41. Alternatively, a detection sensor that detects the operation of the operation member 41 may be separately provided, and the operation state of the operation member 41 may be detected by using a signal from the detection sensor.

The determinator Ud determines whether the operation state detected by the detector Uc is the specific operation state. The specific operation state is, for example, an operation state of the operation member 41 for reversing the operation direction of the hydraulic actuator (the working-tool cylinder C5) (an operation state for causing the bucket 17 to swing back and forth (to perform bucket shaking)).

The determinator Ud determines that the operation state detected by the detector Uc is the specific operation state if the operation member 41 is swung from side to side within a certain period of time. Thus, if the operation member 41 is not swung from side to side within a certain period of time, the determinator Ud does not determine that the operation state detected by the detector Uc is the specific operation.

When the determinator Ud determines that the operation state is the specific operation state, the actuator Ue causes the first control unit Ua to control the flow rate of the hydraulic fluid supplied to the working-tool cylinder C5 with respect to the operation amount of the operation member 41. In other words, the controller U1 performs the first control when an operation for reversing the operation direction of the hydraulic actuator (the working-tool cylinder D5) is performed. More specifically, the controller U1 performs the first control when the operation for reversing the operation direction of the hydraulic actuator (the working-tool cylinder D5) is repeatedly performed on the operation member 41 within a certain period of time.

When the determinator Ud determines that the operation state is not the specific operation state, the second control unit Ub controls the flow rate of the hydraulic fluid supplied to the working-tool cylinder C5 with respect to the operation amount of the operation member 41. As a result, for example, when the operation member 41 is swung from side to side at high speed in order to cause the bucket 17 to perform bucket shaking, the hydraulic-fluid flow rate supplied from the working-tool control valve V1 to the working-tool cylinder C5 is controlled at an automatically increased flow rate.

When the operation state of the operation member 41 is not the specific operation state (when the hydraulic-fluid flow rate supplied from the working-tool control valve V1 to the working-tool cylinder C5 does not needs to be controlled at the increased flow rate), the hydraulic-fluid flow rate supplied from the working-tool control valve V1 to the working-tool cylinder C5 is controlled at a normal hydraulic-fluid flow rate, and stable operability of the working tool 17 can be secured.

Also when it is determined that the operation of the operation member 41 is in an operation state for causing the bucket shaking or the like to be performed and the hydraulic-fluid flow rate supplied from the working-tool control valve V1 to the working-tool cylinder C5 is controlled at the increased flow rate, as illustrated in FIG. 9D, the first characteristic line 55 (pa-pg-pd) may be set to abruptly change from the starting end pa of the second control unit Ub to the point pg at the starting end pa so as to increase the current value (hydraulic-fluid flow rate) to the maximum current value (maximum flow rate) H3.

Figure 10A:
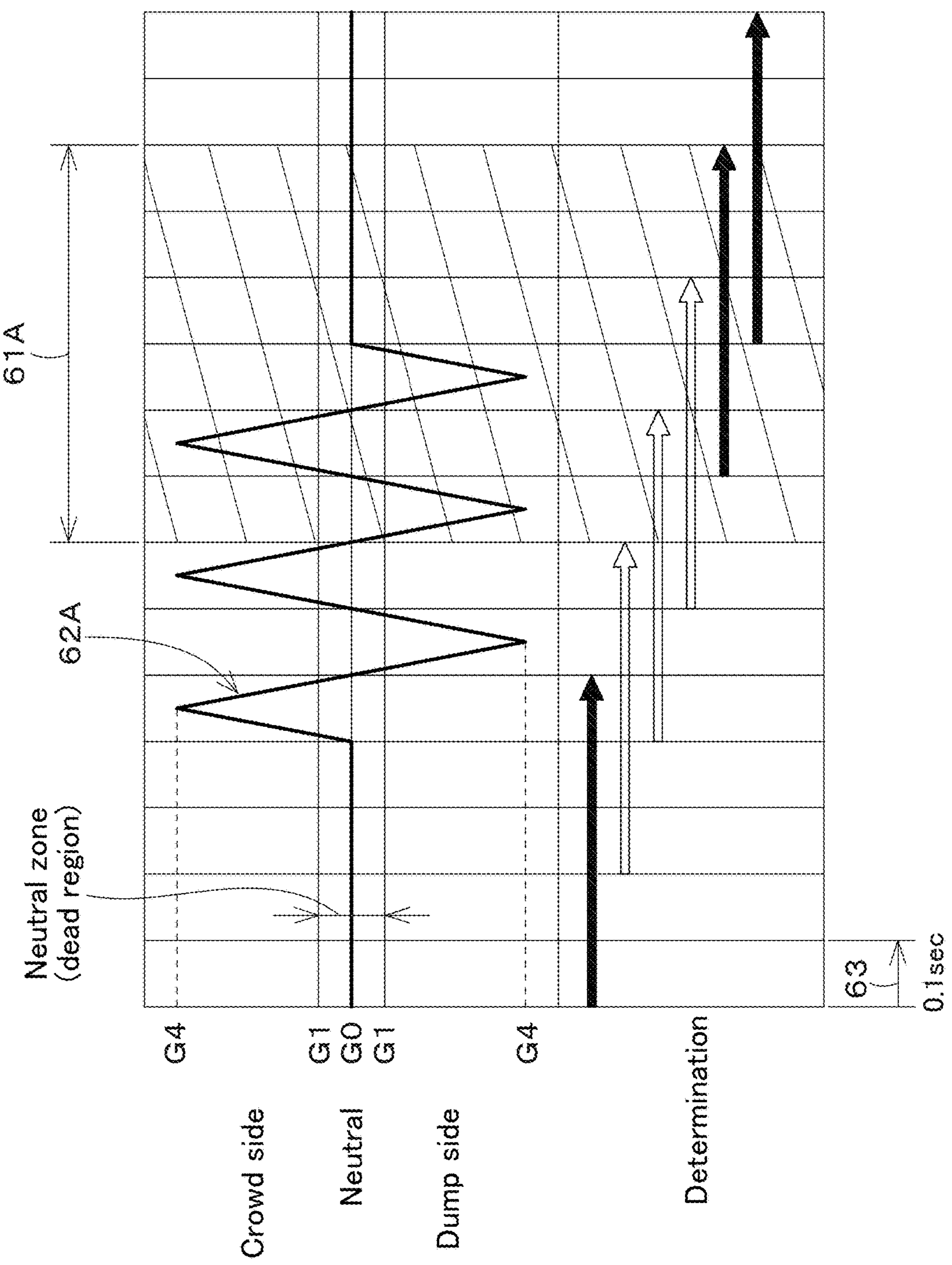
FIG. 10A is a diagram illustrating an operation state of the operation member and determination of the operation state.
Figure 10B:
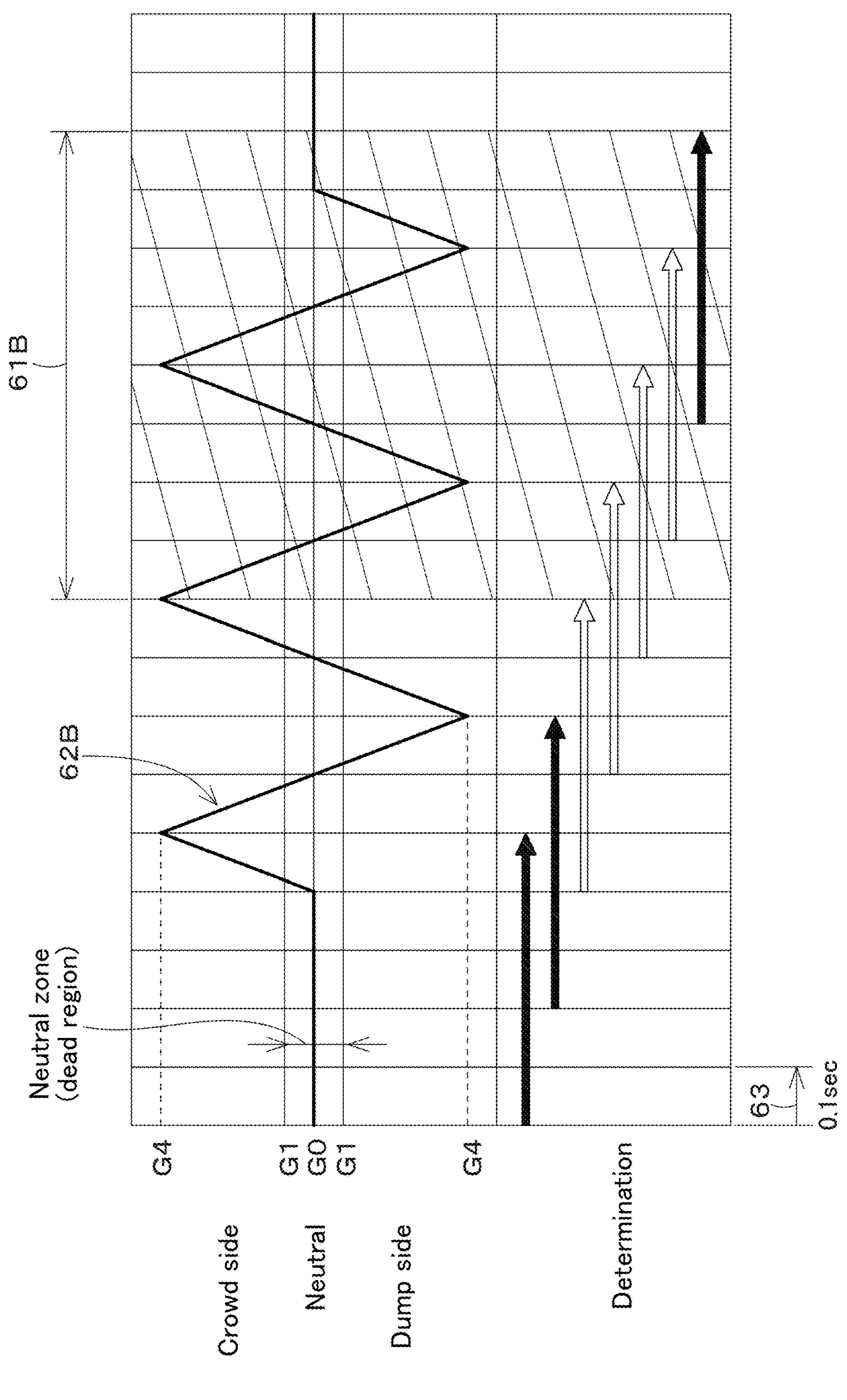
FIG. 10B is a diagram illustrating the operation state of the operation member and determination of the operation state.

FIG. 10A and FIG. 10B are tables each illustrating the operation state of the operation member 41 and determination of whether the operation state is the operation state in the case of performing bucket shaking.

In FIG. 10A and FIG. 10B, the horizontal axis denotes of the table denotes timeline, and each increment along the horizontal axis, denoted by 63, corresponds to 0.1 seconds. A reference sign 62A in FIG. 10A and a reference sign 62B in FIG. 10B indicate the case where the operation member 41 is reciprocated three times. FIG. 10A illustrates the case where the operation member 41 is undergoes a single reciprocating operation (a quick operation) at 0.2 seconds. FIG. 10B illustrates the case where the operation member 41 is undergoes a single reciprocating operation (a slow operation) at 0.4 seconds. In the examples illustrated in FIG. 10A and FIG. 10B, a single reciprocating operation of the operation member 41 corresponds to fully operating the operation member 41 from the neutral position to the bucket-crowd side, returning it to the neutral position, then fully operating the operation member 41 to the bucket-dump side, and returning it to the neutral position.

In FIG. 10A and FIG. 10B, a determination is made by observing the operating state of the operation member 41 for 0.5 seconds at intervals of 0.2 seconds. In FIG. 10A and FIG. 10B, bold arrows indicate the case where it is determined that the operation state of the operation member 41 is not the operation state in the case of performing bucket shaking, and outlined arrows indicate the case where it is determined that the operation state of the operation member 41 is the operation state in the case of performing bucket shaking. A region 61A (a hatched portion) in FIG. 10A and a range 61B (a hatched portion) in FIG. 10B are each a region in which the operation state is determined to be the operation state in the case of performing the bucket shaking and in which the hydraulic-fluid flow rate of hydraulic fluid supplied from the working-tool control valve V1 to the working-tool cylinder C5 is controlled at the increased flow rate. In the case where it is determined that the operation state is not the operation state in the case of performing bucket shaking after the operation state of the operation member 41 has been determined to be the operation state in the case of performing the bucket shaking, the hydraulic-fluid flow rate of hydraulic fluid supplied from the working-tool control valve V1 to the working-tool cylinder C5 returns to the state of being controlled by the second control unit Ub from the state of being controlled by the first control unit Ua.

Note that the selector switch SW may be used to switch between the first control unit Ua and the second control unit Ub to control the flow rate of the hydraulic fluid with respect to the amount of the operation of the operation member 41, to perform control for switching between the first control unit Ua and the second control unit Ub by detecting the operation state of the operation member 41 in the case of performing bucket shaking, and to perform control for switching between the first control unit Ua and the second control unit Ub in the case of operating the working-tool cylinder C5 independently and in the case of operating the working-tool cylinder C5 and at least one of the other hydraulic actuators AC in combination. In this case, it is also possible to give priority to a shake characteristic (FIG. 9D) when the selector switch SW is switched and when it is determined that the operation state is the operation state in the case of performing the bucket shaking.

In addition, in the case where the operation member 41 swings by itself when the operation member 41 (a handle) is released, it is also possible to provide an insensitive region of a normal neutral zone plus something for determination of crowd and dump operations.

In the above-described hydraulic system, each of the control valves V1 to V10 (each of the directional switching valves DV1 to DV10) is formed of a pilot-operated proportional solenoid valve, and the controller U1 controls the current value supplied to each of the control valves V1 to V10 so as to control the pilot control pressure, so that each of the control valves V1 to V10 is controlled. However, the present invention is not limited to this configuration.

Figure 11:
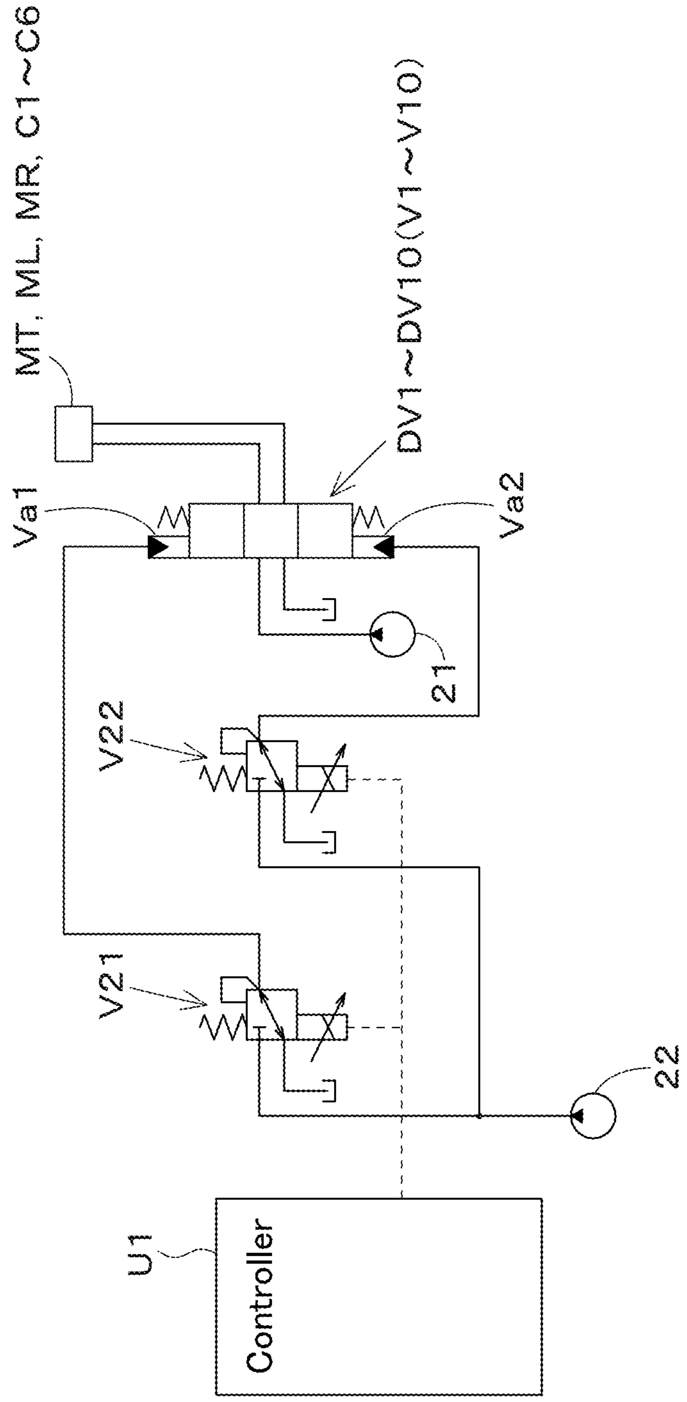

For example, as illustrated in FIG. 11, each of the control valves V1 to V10 may be a pilot-operated switching valve that is pilot-operated by a pilot control pressure applied to the pair of pilot pressure receivers Va1 and Va2, and the pair of proportional solenoid valves V21 and V22 that are controlled by the controller U1 may be provided. A pilot control pressure may be applied to the pilot pressure receiver Va1 by the proportional solenoid valve V21, and a pilot control pressure may be applied to the pilot pressure receiver Va2 by the proportional solenoid valve V22. As a result, the flow direction and the flow rate of the hydraulic fluid with respect to the hydraulic actuators MT, ML, MR, and C1 to C6 may be controlled.

Figure 12:
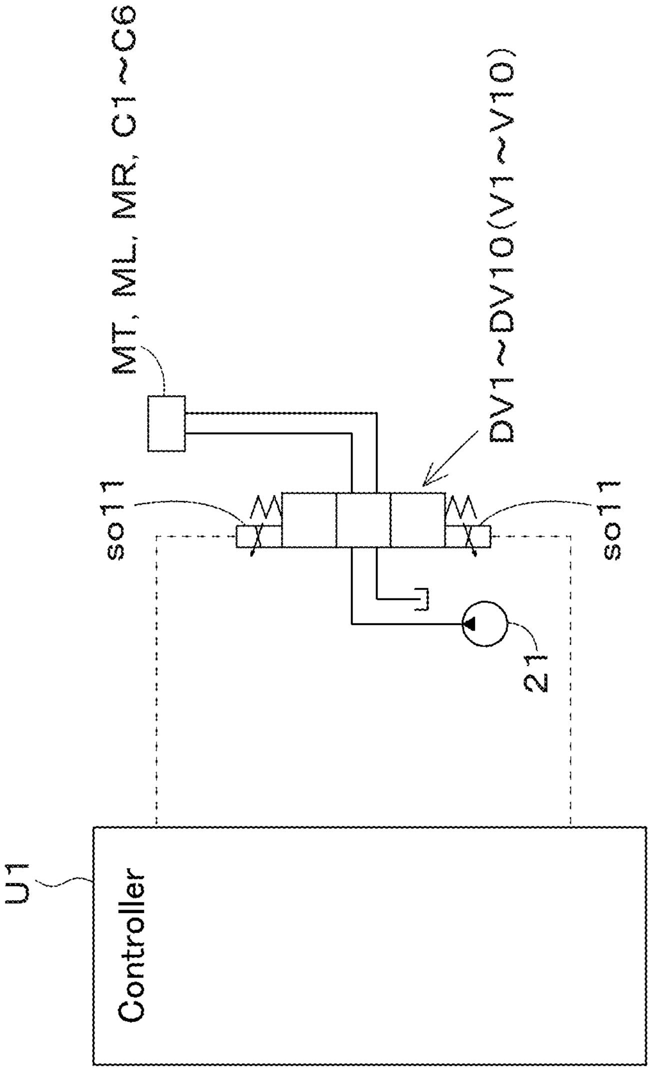

As illustrated in FIG. 12, each of the control valves V1 to V10 may be formed of a proportional-solenoid-type directional and flow control valve whose spool is directly driven by the proportional solenoids so11 each of which is supplied with a current by the controller U1.

The above-described working machine 1 includes the machine body 2, the working devices (the working device 4 and the dozer device 7) mounted on the machine body 2, the hydraulic actuators (the working-tool cylinder C5, the boom cylinder C3, the arm cylinder C4, and the dozer cylinder C1) that drive the working devices, the control valves (the working-tool control valve V1, the boom control valve V2, the arm control valve V7, the dozer first control valve V3, and the dozer second control valve V6) that switch the state of the hydraulic fluid supplied to the hydraulic actuators, the operation members 41 (the first operation actuator 41A, the second operation actuator 41B, and the third operation actuator 41C) that receive operation instructions for the hydraulic actuators, and the controller U1 that controls actuation of the control valves in response to operations performed on the operation members 41. The controller U1 is capable of performing the second control for controlling the actuation of each of the control valves on the basis of the amount of an operation performed on a corresponding one of the operation members 41 and the correspondence between a preset operation amount for the operation member 41 and the actuation amount of the control valve and the first control for controlling, in accordance with the amount of the operation performed on the operation member 41, the actuation of the control valve such that the flow rate of the hydraulic fluid supplied from the control valve to the corresponding hydraulic actuator increases to be greater than that in the second control. The controller U1 performs the first control when the operation performed on the operation member 41 is in a predetermined operation state.

According to this configuration, the responsiveness of each hydraulic actuator can be improved when, for example, a predetermined operation, such as an operation that requires a quick response is performed.

In addition, the working machine 1 includes the other hydraulic actuators different from the hydraulic actuator, and the controller U1 performs the first control when the operation state is a single operation of the hydraulic actuator and performs the second control when the operation state is a combined operation of the hydraulic actuator and at least one of the other hydraulic actuators.

According to this configuration, the hydraulic actuator and at least one of the other hydraulic actuators are operated in combination, the operability of the hydraulic actuators can be ensured, and when quick response is required from the hydraulic actuators, their responsiveness can be improved.

The working machine 1 includes the selector switch SW that receives an instruction to select between the first control and the second control, and the controller U1 performs the second control when an operation is performed on the operation member 41 in a state in which the second control is selected by the selector switch SW, and the controller U1 performs the first control when an operation is performed on the operation member 41 in a state in which the first control is selected by the selector switch SW.

According to this configuration, the first control and the second control can be selected as necessary.

The controller U1 performs the first control when an operation for reversing the operation direction of one of the hydraulic actuators is performed on the corresponding operation member 41.

According to this configuration, the first control is performed in response to the operation of the operation member 41, and thus, the responsiveness when quick response is required is favorable.

The controller U1 performs the first control when the operation for reversing the operation direction of the hydraulic actuator is repeatedly performed on the operation member 41 within a certain period of time.

According to this configuration, the controller U1 can improve its recognition certainty when quick response is required.

Each of the control valves is pilot-operated by a pilot control pressure that is controlled based on a control signal transmitted by the controller, and the controller U1 increases the pilot control pressure in the first control to be greater than that in the second control.

According to this configuration, the flow rate of the hydraulic fluid supplied to the hydraulic actuators can be easily increased.

Each of the control valves is controlled in accordance with the current value supplied from the controller U1, and the controller sets the current value supplied to the control valves in the first control to be greater than that in the second control.

This configuration also makes it possible to easily increase the flow rate of the hydraulic fluid supplied to the hydraulic actuators.

The controller U1 stores the first characteristic line indicating the relationship between an operation amount of the operation member 41 and the current value in the first control and the second characteristic line indicating the relationship between an operation amount of the operation member 41 and the current value in the second control, and the degree of change in the current value with respect to changes in the operation amount of the operation member 41 in the first characteristic line is set to be greater than the degree of change in the current value with respect to changes in the operation amount of the operation member 41 in the second characteristic line.

According to this configuration, the flow rate of the hydraulic fluid supplied to the hydraulic actuators can be controlled to be increased.

In addition, the controller U1 sets the operation amount of the operation member with the maximum current value in the first characteristic line 55 to be less than the operation amount of the operation member 41 with the maximum current value in the second characteristic line.

According to this configuration, some leeway can be given to the change in the slope of the first characteristic line 55.

The current value corresponding to the operation amount of the operation member 41 is set to be greater in the first characteristic line 55 than in the second characteristic line 56 until the operation amount of the operation member 41 reaches the predetermined operation amount that is less than the maximum operation amount. The current value in the second characteristic line 56 is set to be the same as the maximum current value in the first characteristic line 55 when the operation amount of the operation member 41 exceeds the predetermined operation amount.

Also with this configuration, the flow rate of the hydraulic fluid supplied to the hydraulic actuator can be controlled to be increased.

The working machine 1 includes the selector switch SW that receives an instruction to select between the first control and the second control, and when the first control is selected by the selector switch SW, the controller U1 sets the current value corresponding to the operation amount of the operation member to the maximum current value.

According to this configuration, the responsiveness when quick response is required can be improved as much as possible.

In addition, when the first control is selected by the selector switch SW, the controller U1 automatically performs the control for repeatedly reversing the operation direction of the corresponding hydraulic actuator.

According to this configuration, since the control for repeatedly reversing the operation direction of the corresponding hydraulic actuator is automatically performed, a manual operation is unnecessary, making it very convenient.

The working machine 1 includes the other hydraulic actuators different from the hydraulic actuator, and the working machine 1 may further include a variable displacement pump that delivers the hydraulic fluid for causing the plurality of hydraulic actuators including the hydraulic actuator and the other hydraulic actuators to operate and a load sensing system that controls the pump in such a manner that the pressure difference between the delivery pressure of the pump and the highest load pressure among the plurality of hydraulic actuators becomes a constant pressure.

The working machine 1 includes the boom 15 swingably supported on the machine body 2, the arm 16 swingably supported on the boom 15, and the working tool 17 swingably supported on the arm 16. The hydraulic actuators are any one or more of the boom cylinder C3 that causes the boom 15 to swing, the arm cylinder C4 that causes the arm 16 to swing, and the working-tool cylinder C5 that causes the working tool 17 to swing.

According to this configuration, the responsiveness of the operation of at least one of the boom cylinder C3, the arm cylinder C4, and the working-tool cylinder C5 can be improved. For example, when the bucket 17 is caused to perform a shaking operation, the responsiveness of the bucket 17 can be ensured.

The working machine 1 further includes the dozer device 7 that includes the blade 7A and the dozer cylinder C1 that causes the blade 7A of swing, and the hydraulic actuator is the dozer cylinder C1.

According to this configuration, the response of the operation of the dozer cylinder C1 can be improved.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a machine body;

a working device mounted on the machine body;

a hydraulic actuator to drive the working device;

a control valve to switch a state of a hydraulic fluid supplied to the hydraulic actuator;

an operation member to receive an operation instruction for the hydraulic actuator; and a controller to control actuation of the control valve in response to an operation performed on the operation member, wherein:

the control valve is pilot-operated by a pilot control pressure that is controlled based on a control signal transmitted by the controller, and the controller is capable of performing second control for controlling actuation of the control valve based on an amount of an operation performed on the operation member and a correspondence between a preset operation amount for the operation member and an actuation amount of the control valve and first control for controlling, in accordance with an operation amount that is an amount of an operation performed on the operation member, actuation of the control valve in such a manner that a flow rate of a hydraulic fluid supplied from the control valve to the hydraulic actuator increases to be greater than in the second control, and the controller performs the first control when an operation on the operation member is performed to realize a predetermined operation state, and increases the pilot control pressure in the first control to be greater than in the second control.

2. The working machine according to claim 1, comprising:

another hydraulic actuator different from the hydraulic actuator, wherein the controller performs the first control when the realized operation state is a state where a single operation of the hydraulic actuator is performed, and performs the second control when the realized operation state is a state where a combined operation of the hydraulic actuator and the another hydraulic actuator is performed.

3. The working machine according to claim 1, comprising:

a selector switch to receive an instruction to select between the first control and the second control, wherein the controller performs the second control when the operation on the operation member is performed in a state in which the second control is selected by the selector switch, and performs the first control when the operation on the operation member is performed in a state in which the first control is selected by the selector switch.

4. The working machine according to claim 3, wherein the controller automatically performs control for repeatedly reversing an operation direction of the hydraulic actuator when the first control is selected by the selector switch.

5. The working machine according to claim 1, wherein the controller performs the first control when an operation for reversing an operation direction of the hydraulic actuator is performed on the operation member.

6. The working machine according to claim 1, wherein the controller performs the first control when an operation for reversing an operation direction of the hydraulic actuator is repeatedly performed on the operation member within a certain period of time.

7. The working machine according to claim 1, wherein the control valve is controlled in accordance with a current value supplied thereto from the controller, and the controller increases the current value supplied to the control valve in the first control to be greater than in the second control.

8. The working machine according to claim 7, comprising:

a selector switch to receive an instruction to select between the first control and the second control, wherein the controller sets the current value corresponding to an operation amount of the operation member to a maximum current value when the first control is selected by the selector switch.

9. The working machine according to claim 8, wherein the controller automatically performs control for repeatedly reversing an operation direction of the hydraulic actuator when the first control is selected by the selector switch.

10. The working machine according to claim 1, comprising:

another hydraulic actuator different from the hydraulic actuator;

a variable displacement pump to deliver a hydraulic fluid for causing a plurality of hydraulic actuators including the hydraulic actuator and the another hydraulic actuator to operate; and a load sensing system to control the pump in such a manner that a pressure difference between a delivery pressure of the pump and a highest load pressure among the plurality of hydraulic actuators becomes a constant pressure.

11. The working machine according to claim 1, comprising:

a boom swingably supported on the machine body;

an arm swingably supported on the boom; and a working tool swingably supported on the arm, wherein the hydraulic actuator is any one or more of a boom cylinder to cause the boom to swing, an arm cylinder to cause the arm to swing, and a working-tool cylinder to cause the working tool to swing.

12. The working machine according to claim 1, comprising:

a dozer device including a blade and a dozer cylinder to cause the blade to swing, wherein the hydraulic actuator is the dozer cylinder.

13. A working machine comprising:

a machine body;

a working device mounted on the machine body;

a hydraulic actuator to drive the working device;

a control valve to switch a state of a hydraulic fluid supplied to the hydraulic actuator;

an operation member to receive an operation instruction for the hydraulic actuator; and a controller to control actuation of the control valve in response to an operation performed on the operation member, wherein the control valve is controlled in accordance with a current value supplied thereto from the controller, the controller is capable of performing second control for controlling actuation of the control valve based on an amount of an operation performed on the operation member and a correspondence between a preset operation amount for the operation member and an actuation amount of the control valve and first control for controlling, in accordance with an operation amount that is an amount of an operation performed on the operation member, actuation of the control valve in such a manner that a flow rate of a hydraulic fluid supplied from the control valve to the hydraulic actuator increases to be greater than in the second control, and the controller performs the first control when an operation on the operation member is performed to realize a predetermined operation state, and increases the current value supplied to the control valve in the first control to be greater than in the second control, the controller stores a first characteristic line indicating a relationship between the operation amount of the operation member and the current value in the first control and a second characteristic line indicating a relationship between the operation amount of the operation member and the current value in the second control, and a degree of change in the current value with respect to a change in the operation amount of the operation member in the first characteristic line is set to be greater than a degree of change in the current value with respect to a change in the operation amount of the operation member in the second characteristic line.

14. The working machine according to claim 13, wherein the controller sets an operation amount of the operation member corresponding to a maximum current value in the first characteristic line to be less than an operation amount of the operation member corresponding to a maximum current value in the second characteristic line.

15. The working machine according to claim 13, wherein the current value corresponding to the operation amount of the operation member is set to be greater in the first characteristic line than in the second characteristic line until the operation amount of the operation member reaches a predetermined operation amount that is less than a maximum operation amount, and the current value in the second characteristic line is set to be equal to a maximum current value in the first characteristic line when the operation amount of the operation member exceeds the predetermined operation amount.

* * * * *